(12) United States Patent
Faxér et al.

(10) Patent No.: US 11,581,930 B2
(45) Date of Patent: Feb. 14, 2023

(54) CHANNEL STATE INFORMATION (CSI) FEEDBACK WITH MULTIPLE HYPOTHESES

(71) Applicant: Telefonaktiebolaget LM Ericsson (publ), Stockholm (SE)

(72) Inventors: Sebastian Faxér, Järfälla (SE); Shiwei Gao, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/971,463

(22) PCT Filed: Feb. 25, 2019

(86) PCT No.: PCT/IB2019/051502
§ 371 (c)(1),
(2) Date: Aug. 20, 2020

(87) PCT Pub. No.: WO2019/162917
PCT Pub. Date: Aug. 29, 2019

(65) Prior Publication Data
US 2020/0395989 A1 Dec. 17, 2020

Related U.S. Application Data

(60) Provisional application No. 62/635,267, filed on Feb. 26, 2018.

(51) Int. Cl.
*H04B 7/06* (2006.01)
*H04L 5/00* (2006.01)

(52) U.S. Cl.
CPC ......... *H04B 7/0626* (2013.01); *H04L 5/0023* (2013.01); *H04L 5/0048* (2013.01); *H04L 5/0057* (2013.01); *H04L 5/0092* (2013.01)

(58) Field of Classification Search
CPC .. H04B 7/0626; H04B 17/345; H04B 7/0452; H04L 5/0023; H04L 5/0048; H04L 5/0057; H04L 5/0092
See application file for complete search history.

(56) References Cited

U.S. PATENT DOCUMENTS

| 2013/0301450 A1 | 11/2013 | Geirhofer et al. |
| 2014/0198751 A1 | 7/2014 | Prasad et al. |

(Continued)

FOREIGN PATENT DOCUMENTS

| CN | 102694622 A | 9/2012 |
| JP | 2016509405 A | 3/2016 |

(Continued)

OTHER PUBLICATIONS

R1-1712226 "General Framework for CSI acquisition and beam management", Aug. 2017, Huawei, pp. 1-10.*

(Continued)

*Primary Examiner* — Sophia Vlahos
(74) *Attorney, Agent, or Firm* — Christopher & Weisberg, P.A.

(57) ABSTRACT

A method, wireless device and network node for CSI feedback with multiple interference hypotheses are disclosed. According to one aspect, a method implemented in a wireless device (WD) includes receiving a configuration for Channel State Information (CSI) measurement including a first Non-Zero Power Channel State Information-Reference Signal (NZP CSI-RS) resource set for channel measurement and a second NZP CSI-RS resource set for interference measurement, the first NZP CSI-RS resource set having only one NZP CSI-RS resource. The method also includes measuring CSI based on the first and the second NZP CSI-RS resource sets.

10 Claims, 13 Drawing Sheets

(56) References Cited

U.S. PATENT DOCUMENTS

2017/0006492 A1  1/2017  Khoshnevisan et al.
2020/0119822 A1* 4/2020  Li ..................... H04B 7/0632

FOREIGN PATENT DOCUMENTS

WO    WO 2016/202374   * 12/2016  ............... H04L 5/00
WO        2017028006 A1   2/2017
WO        2019/099857 A1   5/2019

OTHER PUBLICATIONS

R1-1717299 "Channel and Interference Measurement for CSI Acquisition", Huawei, HiSilicon, 3 GPP TSG RAN WG1 Meeting #90bis, Oct. 9-13, 2017 (Year: 2017).*
Ericsson 3GPP TSG-RAN WG1 NR Ad Hoc #3; R1-1716348; Title: On Interference Measurement and CSI for Reciprocity Based Operation; Agenda Item: 6.2.2.1; Document for: Discussion and Decision; Nagoya, Japan Sep. 18-21, 2017, consisting of 10 pages.
Ericsson 3GPP TSG-RAN WG1 #90bis; R1-1718431; Title: On CSI Measurement; Agenda Item: 7.2.2.1 Document for: Discussion and Decision; Prague, Czech Republic, Oct. 9-13, 2017, consisting of 12 pages.
Ericsson 3GPP TSG RAN WG1 Meeting #92; R1-1802741; Title: Corrections and Clarifications on CSI Measurements; Agenda Item: 7.1.2.2.1; Document for: Discussion and Decision; Athens, Greece, Feb. 26-Mar. 2, 2018, consisting of 13 pages.
Huawei, Hisilicon 3GPP TSG RAN WG1 Meeting #91; R1-1719426; Title: Remaining Issues for CSI Framework Agenda Item: 7.2.2.6; Document for: Discussion and Decision; Reno, USA, Nov. 27-Dec. 1, 2017, consisting of 8 pages.
Mediatek Inc. 3GPP TSG RAN WG1 Meeting #92; R1-1801653; Title: Remaining Issues in CSI Measurement; Agenda Item: 7.1.2.2.1; Document for: Discussion; Athens, Greece, Feb. 26-Mar. 2, 2018, consisting of 3 pages.
ZTE, Sanechips 3GPP TSG RAN WG1 Meeting #92; R1-1801579; Title: Remaining Details on CSI Measurement; Agenda Item: 7.1.2.2.1; Document for: Discussion and Decision; Athens, Greece, Feb. 26-Mar. 2, 2018, consisting of 6 pages.
ETSI TS 138 214 V15.3.0 Release 15; (Oct. 2018) 5G; NR; Physical Layer Procedures for Data, consisting of 99 pages.
International Search Report and Written Opinion dated Jun. 24, 2019 issued in PCT Application No. PCT/IB2019/051502, consisting of 16 pages.
Written Opinion of the International Preliminary Examining Authority dated Mar. 6, 2020 issued in PCT Application No. PCT/IB2019/051502, consisting of 9 pages.
Notification of Transmittal of the International Preliminary Report on Patentability dated Jul. 2, 2020 issued in PCT Application No. PCT/IB2019/051502, consisting of 22 pages.
Canadian Office Action dated Aug. 26, 2021 issued in Canadian Patent Application No. 3,091,207, consisting of 5 pages.
Japanese Office Action and English translation dated Nov. 12, 2021 issued in Japanese Patent Application No. 2020-544802, consisting of 14 pages.
3GPP TSG RAN WG1 Meeting #91; R1-1719424; Agenda Item: 7.2.2.1; Source: Huawei, HiSilicon; Title: Channel and Interference Measurement for CSI Acquisition; Document for: Discussion and Decision; Reno, USA, Nov. 27-Dec. 1, 2017, consisting of 8 pages.
3GPP TSG RAN WG1 Meeting #91; R1-1719767; Agenda Item: 7.2.2.1; Source: Vivo; Title: Remaining Details on CSI Measurement; Document for: Discussion and Decision; Reno, USA, Nov. 27-Dec. 1, 2017, consisting of 6 pages.
Korean Notice of Preliminary Rejection and English language summary of the Notice of Preliminary Rejection issued in Korean Application No. 2020-7027481 dated Jun. 28, 2022, consisting of 8 pages.
LG Electronics, R1-1718953; 3GPP TSG RAN WG1 Meeting #90bis; WF on CSI Timing; Agenda Item: 7.2.2.1; Prague, CZ, Oct. 9-13, 2017, consisting of 3 pages.
Chinese Office Action and machine English translation of the Chinese Office Action dated Nov. 30, 2022 issued in corresponding Chinese Application No. 2019800283938, consisting of 9 pages.

* cited by examiner

PDCCH (data)    Control PDCCH, Possibly data

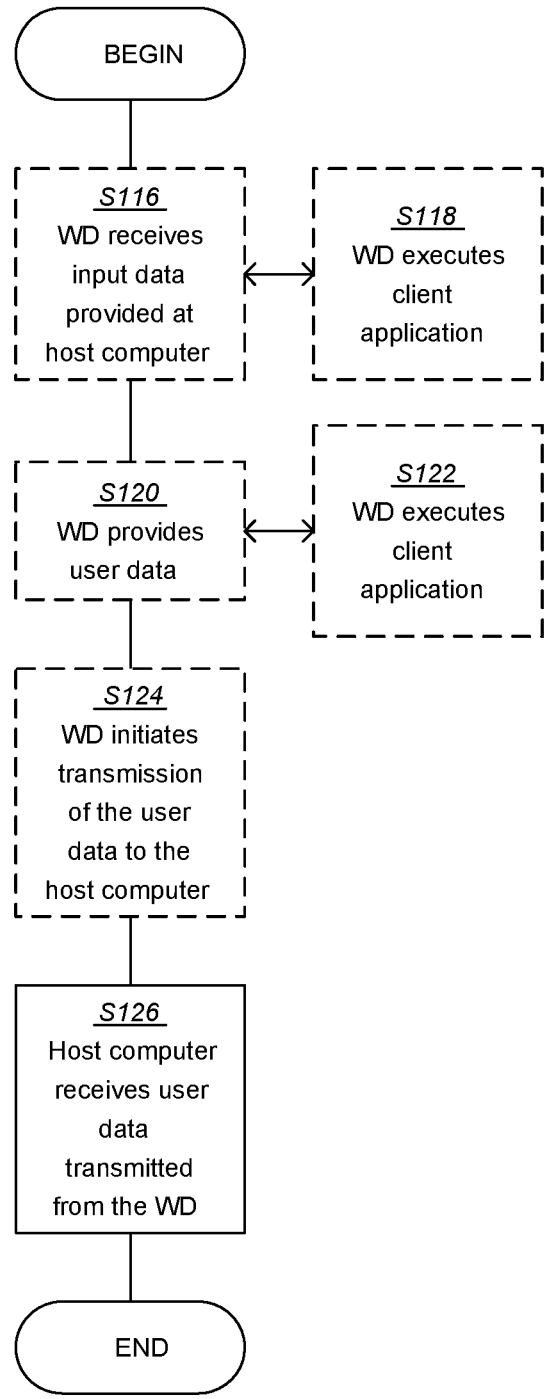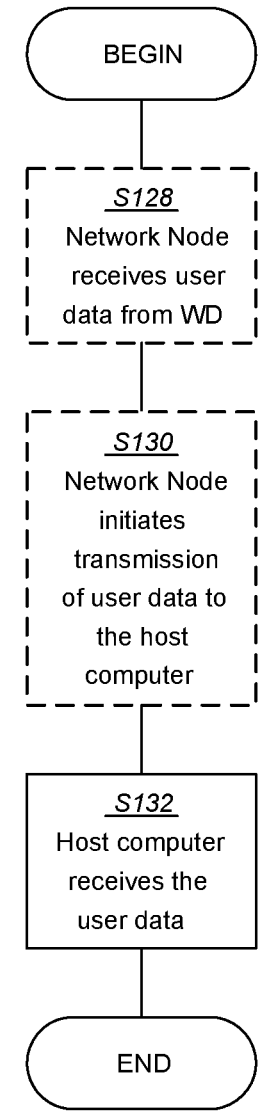
FIG. 13
FIG. 14

NZP CSI-RS resource set (CMR): | C_0 | C_1 | ... | C_K |

NZP CSI-RS resource set (IMR): | I_0 | I_1 | ... | I_K |

FIG. 17

NZP CSI-RS resource set (CMR): | C | C | ... | C |

NZP CSI-RS resource set (IMR): | I_0 | I_1 | ... | I_K |

FIG. 18

CHANNEL STATE INFORMATION (CSI) FEEDBACK WITH MULTIPLE HYPOTHESES

CROSS-REFERENCE TO RELATED APPLICATIONS

This application is a Submission Under 35 U.S.C. § 371 for U.S. National Stage Patent Application of International Application No.: PCT/IB2019/051502, filed Feb. 25, 2019 entitled "CHANNEL STATE INFORMATION (CSI) FEEDBACK WITH MULTIPLE HYPOTHESES," which claims priority to U.S. Provisional Application No. 62/635,267, filed Feb. 26, 2018, entitled "CHANNEL STATE INFORMATION (CSI) FEEDBACK WITH MULTIPLE HYPOTHESES," the entireties of both of which are incorporated herein by reference.

TECHNICAL FIELD

The present disclosure relates to wireless communications, and in particular, to Channel State Information (CSI) feedback with multiple interference hypotheses.

BACKGROUND

The next generation of mobile wireless communication system (5G) or New Radio (NR) may support a diverse set of use cases and a diverse set of deployment scenarios. The later may include deployment at both low frequencies (e.g., 100s of MHz), similar to existing Long Term Evolution (LTE) technology, and very high frequencies (e.g., mm waves in the tens of GHz).

Similar to LTE, wireless communication networks, such as, for example, NR may use Orthogonal Frequency Division Multiplexing (OFDM) in the downlink (DL), i.e., from a network node, e.g., gNB, eNB, and/or a base station, to a user equipment (UE) and/or a wireless device (WD). In the Uplink (UL), i.e., from UE and/or WD to a network node and/or base station (e.g., gNB), both OFDM and Discrete Fourier Transform (DFT)-spread OFDM (DFT-S-OFDM), also known as Single Carrier Frequency Division Multiple Access (SC-FDMA) in LTE, may be supported. The basic NR physical resource can thus be seen as a time-frequency grid as illustrated in, for example, FIG. 1, where a resource block (RB) in a 14-symbol slot is shown. A resource block may correspond to 12 contiguous subcarriers in the frequency domain. Resource blocks can be numbered in the frequency domain, starting with 0 from one end of the system bandwidth. Each resource element (RE) may correspond to one OFDM subcarrier during one OFDM symbol interval.

For convenience, the term WD will be used; however, it should be understood that the terms WD and/or UE may be used interchangeably herein.

Different subcarrier spacing values may be supported in NR. The supported subcarrier spacing values (also referred to as different numerologies) may be given by $\Delta f=(15\times2^{\alpha})$ kHz where $\alpha$ is a non-negative integer and $\Delta f=15$ kHz may be considered the basic (or reference) subcarrier spacing that is also used in LTE.

In the time domain, downlink and uplink transmissions in NR may be organized into equally-sized subframes of 1 ms each, similar to LTE. A subframe may be further divided into multiple slots of equal duration. The slot length at different subcarrier spacings is shown, for example, in Table 1. There may be only one slot per subframe at $\Delta f=15$ kHz and a slot may have 14 OFDM symbols.

TABLE 1

| Slot length at different numerologies. | | |
|---|---|---|
| Numerology | Slot length | RB BW |
| 15 kHz | 1 ms | 180 kHz |
| 30 kHz | 0.5 ms | 360 kHz |
| 60 kHz | 0.25 ms | 720 kHz |
| 120 kHz | 125 µs | 1.44 MHz |
| 240 kHz | 62.5 µs | 2.88 MHz |

It is understood that, data scheduling in NR can be performed on a slot basis. An example is shown in FIG. 2 with a 14-symbol slot, where the first two symbols include control channel (e.g., Physical Downlink Control Channel (PDCCH)) and the rest of the symbols include data channel (e.g., Physical Downlink Shared Channel (PDSCH)).

Downlink transmissions may be dynamically scheduled, i.e., in each slot the network node (e.g., gNB) may transmit Downlink Control Information (DCI) about which WD data is to be transmitted to and which resource blocks in the current downlink slot the data is transmitted on. This control signaling is typically transmitted in the first one or two OFDM symbols in each slot in NR. The control information may be carried on PDCCH and data may be carried on PDSCH. A WD may first detect and decode PDCCH and if a PDCCH is decoded successfully, it may also decode the corresponding PDSCH based on the decoded control information in the PDCCH.

Uplink data transmission may also be dynamically scheduled using PDCCH. Similar to downlink, a WD may first decode uplink grants in PDCCH and then may transmit data over the Physical Uplink Shared Channel (PUSCH) based the decoded control information in the uplink grant such as, for example, a modulation order, coding rate, uplink resource allocation, etc.

Spatial Multiplexing

Multi-antenna techniques can significantly increase the data rates and reliability of a wireless communication system. The performance can in particular be improved if both the transmitter and the receiver are equipped with multiple antennas, which results in a multiple-input multiple-output (MIMO) communication channel. Such systems and/or related techniques are commonly referred to as MIMO.

A component in LTE and NR is the support of MIMO antenna deployments and MIMO related techniques. Spatial multiplexing is one of the MIMO techniques used to achieve high data rates in favorable channel conditions. An illustration of spatial multiplexing operation is provided in FIG. 3.

As seen, for example in FIG. 3, the information carrying symbol vector $s=[s_1, s_2, \ldots, s_r]^T$ is multiplied by an $N_T \times r$ precoder matrix W, which may serve to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s may each correspond to a layer and r may be referred to as the transmission rank. In this way, spatial multiplexing may be achieved because multiple symbols can be transmitted simultaneously over the same time/frequency resource element (RE). The number of symbols r is typically adapted to suit the current channel properties.

The received signal at a WD with $N_R$ receive antennas at a certain RE n may be given by $$y_n = H_n W s + e_n,$$

where $y_n$ is a $N_R \times 1$ received signal vector, $H_n$ a $N_R \times N_T$ channel matrix at the RE, $e_n$ is a $N_R \times 1$ noise and interference vector received at the RE by the WD. The precoder W can be a wideband precoder, which may be considered a constant over frequency, or frequency selective, i.e. different over frequency.

The precoder matrix is often chosen to match the characteristics of the $N_R \times N_T$ MIMO channel matrix $H_n$, resulting in so-called channel dependent precoding. This may also commonly be referred to as closed-loop precoding and essentially strives to focus the transmit energy into a subspace which may be considered strong, in the sense of conveying much of the transmitted energy to the WD. In addition, the precoder matrix may also be selected to strive for orthogonalizing the channel, meaning that after proper linear equalization at the WD, the inter-layer interference may be reduced.

The transmission rank, and thus the number of spatially multiplexed layers, may be reflected in the number of columns of the precoder. The transmission rank may also be dependent on the signal to noise plus interference ratio (SINR) observed at the WD. Typically, a higher SINR is required for transmissions with higher ranks. For efficient performance, it is worth mentioning that a transmission rank that matches the channel properties as well as the interference may be selected. The precoding matrix, the transmission rank, and the channel quality are part of Channel State Information (CSI), which is typically measured by a WD and fed back to a network node (e.g., gNB).

CSI Feedback

For CSI feedback, as in LTE, NR has adopted an implicit CSI mechanism where a WD's feedback of the downlink channel state information may be in terms of a transmission rank indicator (RI), a precoder matrix indicator (PMI), and one or two channel quality indicator(s) (CQI). The CQI/RI/PMI report can be either wideband or subband based on configuration.

The RI may correspond to a recommended number of layers that are to be spatially multiplexed and thus transmitted in parallel over the effective channel. The PMI may be considered to identify a recommended precoder. The CQI may be considered to represent a recommended modulation level (e.g., QPSK, 16QAM, etc.) and coding rate for each transport block. NR supports transmission of one or two transport blocks to a WD in a slot. There can thus be a relation between a CQI and an SINR of the spatial layers over which the transport block or blocks are transmitted.

Channel State Information Reference Signals (CSI-RS)

Similar to LTE, CSI-RS was introduced in NR for channel estimations in the downlink. A CSI-RS may be transmitted on each transmit antenna (or antenna port) and may be used by a WD to measure downlink channel associated with each antenna port. Up to 32 CSI reference signals may be defined. The antenna ports may also be referred to as CSI-RS ports. The supported number of antenna ports in NR may be {1, 2, 4, 8, 12, 16, 24, 32}. By measuring the received CSI-RS, a WD can estimate the channel the CSI-RS is traversing, including the radio propagation channel and antenna gains. The CSI-RS may also be referred to as Non-Zero Power (NZP) CSI-RS.

CSI-RS may be transmitted in certain REs and slots. FIG. 4 shows an example of the REs for CSI-RS for 12 antenna ports, where 1 RE per RB per port is shown.

In addition to NZP CSI-RS, Zero Power (ZP) CSI-RS was introduced in NR. The purpose was to indicate to a WD that the associated REs are muted at the network node (e.g., eNB). If the ZP CSI-RS is allocated to be fully overlapping with NZP CSI-RS in an adjacent cell, it can be used to improve channel estimation by WDs in the adjacent cell since there is no interference created by this cell.

It has been considered that the CSI interference measurement resource (IMR) and/or (CSI-IM) can be used in NR for a WD to measure interference, typically from other cells. CSI-IM may include 4 REs per RB in a slot, either 4 consecutive REs in one OFDM symbol or two consecutive REs in both frequency and time domains. By measuring both the channel based on a NZP CSI-RS and the interference based on an IMR, a WD can estimate the effective channel and noise plus interference to determine the CSI, i.e. rank, precoding matrix, and the channel quality.

Non-Precoded vs. Precoded or Beamformed CSI-RS

The beamformed (or precoded) CSI-RS concept was introduced in LTE, in which a CSI-RS may be precoded and transmitted over more than one antenna ports. This is in contrast with non-precoded CSI-RS in which each CSI-RS may be transmitted on one antenna port. Beamformed CSI-RS can be used when the direction of a WD or WDs is roughly known so that CSI-RS can be transmitted in a narrow beam or beams to reach the WD or WDs. This can improve CSI-RS coverage with increased beamforming gain and also reduce CSI-RS resource and CSI feedback overhead. This beamformed or precoded CSI-RS is typically used in a WD-specific manner and transmitted in an as-needed basis, or aperiodically.

NR supports CSI feedback with beamformed CSI-RS, in which a WD is configured with a NZP CSI-RS resource set of K NZP CSI-RS resources and a CSI-IM resource set of K CSI-IM resources. The kth CSI-IM resource may be associated with the kth NZP CSI-RS resource. The WD may first determine a NZP CSI-RS resource (based on received power for example) and then estimate CSI based on the selected NZP CSI-RS resource for channel measurement and the associated CSI-IM resource for interference measurement. The WD may then feed back the selected NZP CSI-RS resource index (CRI) in the NZP CSI-RS resource set and the estimated CSI.

MU-MIMO

When all the data layers are transmitted to one WD, it may be referred to as single user MIMO (SU-MIMO). On the other hand, when the data layers are transmitted to multiple WDs, it is referred to as multi-user MIMO (MU-MIMO). MU-MIMO is possible when, for example, two WDs are in different areas of a cell such that they can be separated through different precoders (or beamforming) at the network node. The two WDs may be served on the same time-frequency resources (i.e., Physical Resource Blocks (PRBs)) by using different precoders or beams.

MU-MIMO Interference

In MU-MIMO, in addition to interference from other cells, also referred to as inter-cell interference, interference among WDs participating in MU-MIMO may also be experienced by the WDs, also referred to as intra-cell interference or MU interference. MU interference is generally more difficult to measure or estimate due to the dynamic nature of WDs paired in MU-MIMO. Assuming there are K WDs sharing the same time-frequency resources in a data transmission, the received signal at the kth (k=1, 2, ..., K) WD and at the $i^{th}$ RE can be expressed as $$y^k(i)=H^k(i)W^k(i)s^k(i)+H^k(i)\Sigma_{m\neq k}{}^K W^m(i)s^m(i)+e^k(i),$$

where $H^k(i)$, $W^k(i)$, $s^k(i)$ are the channel matrix, the precoding matrix and the data vector associated with the kth WD at the $i^{th}$ RE, respectively. $I_{MU}{}^k = H^k(i)\Sigma_{m\neq k}{}^K W^m(i) s^m(i)$ may be considered the MU interference experienced at the kth WD, and $e^k(i)$ is the noise plus inter-cell interference received at the kth WD. Note that, $e^k(i)$ is typically estimated on a CSI-IM resource configured for the WD.

MU Interference Measurement with NZP CSI-RS Based IMR

NZP CSI-RS based IMR can be used in NR for MU interference measurement. The typical use case is that gNB already has some knowledge of the downlink channel for each serving WD through either SU-MIMO CSI feedback or uplink measurement based on channel reciprocity and a MU-MIMO prescheduling is performed, i.e., a group of WDs are determined to be the candidates for a MU-MIMO transmission. The precoder for each of the WDs may be known, but because MU interference is unknown, a further feedback on the rank and CQI based on the prescheduled MU-MIMO transmission may be needed. For this purpose, MU interference can be emulated by using precoded NZP CSI-RS, with each NZP CSI-RS port corresponding to one MU-MIMO layer.

An example is shown in FIG. 5, where a WD #0 is configured with one NZP CSI-RS resource #0 for channel measurement, i.e. as channel measurement resource (CMR) and a set of NZP CSI-RS resources (i.e. resources #1, #2 and #3) for MU interference measurement, i.e. as interference measurement resource (IMR). The WD may consider the total accumulated interferences measured on all the NZP CSI-RS resources as IMR in CSI estimation. For WD #1, NZP CSI-RS resource #1 is configured for channel measurement and a set of NZP CSI-RS resources (i.e. resources #0, #2 and #3) for interference measurement. Similar configurations may be applied/used for WD #2 and WD #3. This may be considered to emulate the MU interference at each WD when the four WDs are paired together in MU-MIMO transmission.

CSI Framework in NR

It has been considered that in NR, a WD can be configured with N≥1 CSI reporting settings, M≥1 Resource settings, and 1 CSI measurement setting, where the CSI measurement setting includes L≥1 links. Each of the L links may correspond to a CSI reporting setting and a Resource setting.

At least the following configuration parameters may be signalled via Radio Resource Control (RRC) signalling, at least for CSI acquisition:

N, M, and L—indicated either implicitly or explicitly;
In each CSI reporting setting, at least: reported CSI parameter(s), CSI Type (I or II) if reported, codebook configuration including codebook subset restriction, time-domain behaviour, frequency granularity for CQI and PMI, measurement restriction configurations; and
In each Resource setting:
A configuration of S≥1 CSI-RS resource set(s)
Note: each set may correspond to different selections from a "pool" of all configured CSI-RS resources to the WD;
A configuration of Ks≥1 CSI-RS resources for each set s, including at least: mapping to REs, the number of ports, time-domain behaviour, etc.; and
In each of the L links in CSI measurement setting: CSI reporting setting indication, Resource setting indication, quantity to be measured (either channel or interference).
One CSI reporting setting can be linked with one or multiple Resource settings; and
Multiple CSI reporting settings can be linked with the same Resource setting.

At least the following may be dynamically selected by Layer 1 (L1) or Layer 2 (L2) signalling, if applicable:

One or multiple CSI reporting settings within the CSI measurement setting;
One or multiple CSI-RS resource sets selected from at least one Resource setting; and/or
One or multiple CSI-RS resources selected from at least one CSI-RS resource set.

In NR, a NZP CSI-RS resource set, instead of NZP CSI-RS resource, may be triggered for CSI reporting. In the example shown in FIG. 5, a NZP CSI-RS resource set with a single NZP CSI-RS resource for channel measurement is configured. When a WD is configured with a NZP CSI-RS resource set with more than one NZP CSI-RS resources for channel measurement and a set of NZP CSI-RS resources for interference measurement, it is unclear how a WD should measure MU interference for each NZP CSI-RS resource as CMR for CSI feedback.

One approach to solve the problem has been considered, in which, when $K_C$ NZP CSI-RS resources $\{C_1, \ldots, C_{K_C}\}$ are configured in a resource set for channel measurement and $K_I$ resources $\{I_1, \ldots, I_{K_I}\}$ are configured in the linked NZP CSI-RS resource set for interference measurement, $C_i$ associated with $$I_{(i-1)}\frac{K_I}{K_C}+1 \text{ to } \frac{I_{iK_I}}{K_C}.$$

This approach assumes $K_I$ is an integer multiple of $K_C$. The use case of this approach is, however, not clear. In a typical MU-MIMO scheduling scenario, the precoder for each WD paired for MU-MIMO is generally known; thus, it does not make sense to change to a different precoder (i.e., use a different CSI-RS resource for channel measurement) and paired with a different set of WDs or the same set of WDs with different precoders (i.e., different CSI-RS resources for interference measurement).

SUMMARY

Some embodiments advantageously provide methods and apparatuses for CSI feedback with multiple interference hypotheses. Some advantages of some embodiments of the present disclosure include allowing a WD to report the best (or most optimal) pairing WD out of multiple candidate WDs for MU-MIMO, wherein 'best' or 'most optimal' is defined based on one or more established criteria.

In one embodiment of the present disclosure, when a WD is configured with a NZP CSI-RS resource set for channel measurement and an associated NZP CSI-RS resource set for interference measurement, the number of resources in the two resource sets are configured to be the same and the kth NZP CSI-RS resource for channel measurement is associated with the kth NZP CSI-RS resource for interference measurement. Moreover, the NZP CSI-RS resources for channel measurement can be the same resource in some embodiments.

In some embodiments, there may be provided a method of channel state information (CSI) feedback in a wireless network comprising of at least a wireless network node and plurality of wireless devices (WDs). The method may include one or more of: configuring, by the network node, a wireless device with a first set of N CSI reference signal (CSI-RS) resources for channel measurement and a second set of M CSI-RS resources for interference measurement; estimating, by the wireless device, a CSI based on channel measurement in the first resource set and interference measurement in the second resource set; and/or reporting, by the wireless device, the CSI and a CSI-RS resource indicator associated with the CSI.

According to one embodiment, N may be equal to M.

According to one embodiment, estimating may further include estimating N CSIs, where the nth CSI is based on a channel measurement on the nth CSI-RS resource in the first resource set and an interference measurement on the nth CSI-RS resource in the second resource set and determining a CSI out of the N CSIs. In another aspect, the CSI-RS resource indicator associated with the CSI is the index of a CSI-RS resource in the first resource set over which the determined CSI is estimated, wherein the first resource in the set has an index of 0. In another aspect, the determining a CSI out of the N CSIs includes selecting the CSI which provides the highest throughput.

According to another embodiment, the N CSI-RS resources in the first resource set are identical.

According to one embodiment, the configuring further includes configuring a third resource set of N CSI-IM resources. In another embodiment, estimating further includes estimating N CSIs, where the nth CSI is based on a channel measurement on the nth CSI-RS resource in the first set and an interference measurement on the nth CSI-RS resource in the second resource set and on the nth CSI-IM resource in the third resource set.

According to one embodiment, N equals 1.

According to one embodiment, the method further comprising signaling an indication on one of: Option a: interferences measured on the CSI-RS resources in the second resource set are to be accumulated for a single CSI estimation; or Option b: interference measured on each CSI-RS resource in the second resource set is used for a separate CSI estimation. According to one embodiment, if Option a is signaled, the CRI is not reported. According to one embodiment, if Option b is signaled, M CSIs are estimated and each is associated with a CSI-RS resource in the second resource set. According to yet another embodiment, estimating further includes determining a CSI out of the M CSIs. According to yet another embodiment, the determining includes selecting a CSI which provides the highest throughput.

Thus, according to one aspect, a method implemented in a WD is provided. The method includes receiving a configuration for Channel State Information, CSI, measurement including a first NZP CSI-RS, resource set for channel measurement and a second NZP CSI-RS resource set for interference measurement, wherein the first NZP CSI-RS resource set has only one NZP CSI-RS resource. The method further includes measuring CSI based on the first and the second NZP CSI-RS resource sets.

According to this aspect, in some embodiments, the CSI measurement comprises a channel measurement based on the first NZP CSI-RS resource set and an interference measurement based on the second NZP CSI-RS resource set. In some embodiments, the CSI measurement considers all interferences on each of one or more NZP CSI-RS resources in the second NZP CSI-RS resource set. In some embodiments, the method further includes reporting the measured CSI.

According to another aspect, a WD comprising processing circuitry is provided. The processing circuitry configured to receive a configuration for Channel State Information, CSI, measurement including a first Non-Zero Power Channel State Information-Reference Signal, NZP CSI-RS, resource set for channel measurement and a second NZP CSI-RS resource set for interference measurement, wherein the first NZP CSI-RS resource set has only one NZP CSI-RS resource. The processing circuitry is also configured to measure CSI based on the first and the second NZP CSI-RS resource sets.

According to this aspect, in some embodiments, the CSI measurement comprises a channel measurement based on the first NZP CSI-RS resource set and an interference measurement based on the second NZP CSI-RS resource set. In some embodiments, the CSI measurement considers all interferences on each of one or more NZP CSI-RS resources in the second NZP CSI-RS resource set. In some embodiments, the processing circuitry is further configured to report the measured Channel State Information, CSI.

According to yet another aspect, a method implemented in a network node is provided. The method includes transmitting a configuration for CSI including a first NZP CSI-RS resource set for channel measurement and a second NZP CSI-RS resource set for interference measurement, wherein the first NZP CSI-RS resource set has only one NZP CSI-RS resource. The method also includes receiving from a WD, measured CSI based on the first and the second NZP CSI-RS resource sets.

According to this aspect, in some embodiments, the CSI measurement comprises a channel measurement based on the first NZP CSI-RS resource set and an interference measurement based on the second NZP CSI-RS resource set. In some embodiments, the CSI measurement considers all interferences on each of one or more NZP CSI-RS resources in the second NZP CSI-RS resource set.

According to another aspect, a network node includes processing circuitry configured to transmit to a WD a configuration for CSI measurement including a first NZP CSI-RS resource set for channel measurement and a second NZP CSI-RS resource set for interference measurement, wherein the first NZP CSI-RS resource set has only one NZP CSI-RS resource. The processing circuitry is further configured to receive from the WD, measured CSI based on the first and the second NZP CSI-RS resource sets.

According to this aspect, in some embodiments, the CSI measurement comprises a channel measurement based on the first NZP CSI-RS resource set and an interference measurement based on the second NZP CSI-RS resource set. In some embodiments, the CSI measurement considers all interferences on each of one or more NZP CSI-RS resources in the second NZP CSI-RS resource set.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIGS. 11-14 are flow charts illustrating exemplary methods implemented in a communication system including a host computer, a network node and a wireless device according to some embodiments of the present disclosure;

FIG. 17 illustrates an example of a first embodiment of resource sets of the present disclosure;

FIG. 18 illustrates an example of a second embodiment of resource sets of the present disclosure;

DETAILED DESCRIPTION

Figure 1:
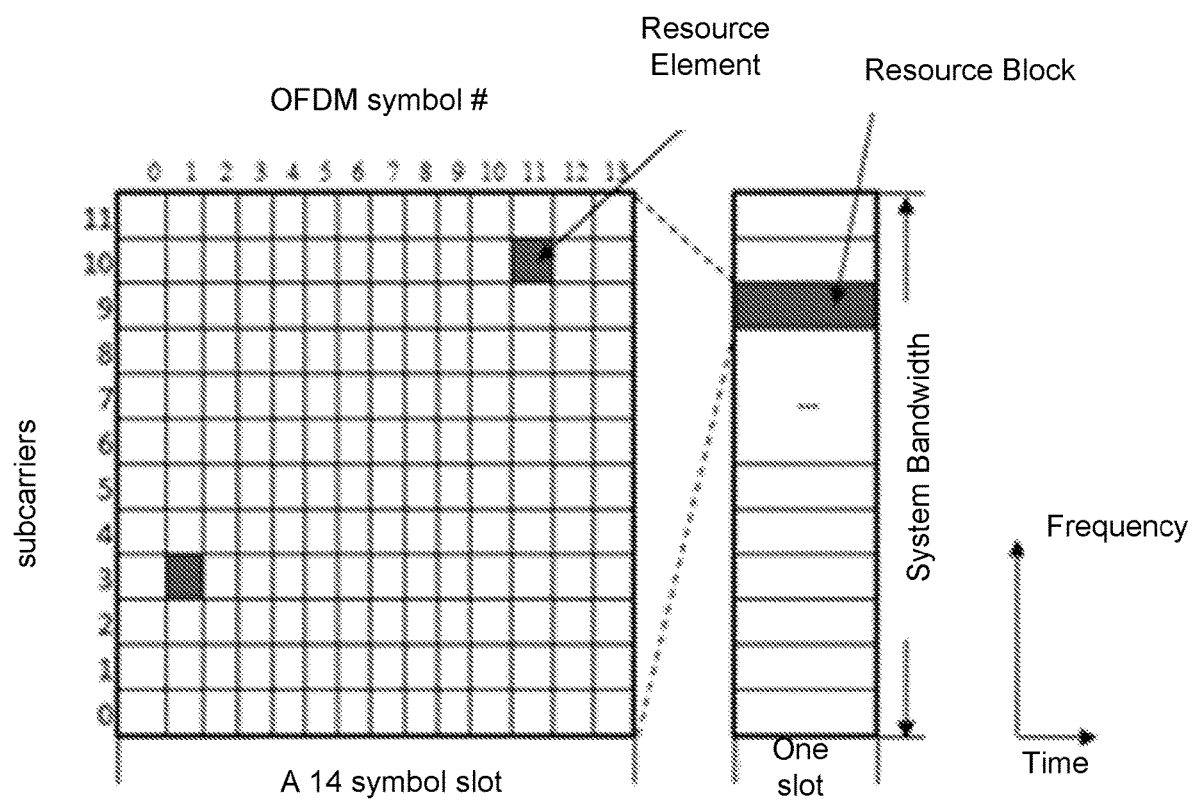
FIG. 1 illustrates an example of NR physical resources.

Before describing in detail exemplary embodiments, it is noted that the embodiments reside primarily in combinations of apparatus components and processing steps related to methods and apparatuses for CSI feedback with multiple interference hypotheses. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide methods and apparatuses for configuring a WD with a first Channel State Information-Reference Signal (CSI-RS) resource set for channel measurement and a second CSI-RS resource set for interference measurement and/or estimating a Channel State Information (CSI) based on the channel measurement in the first CSI-RS resource set and the interference measurement in the second CSI-RS resource set.

Figure 6:
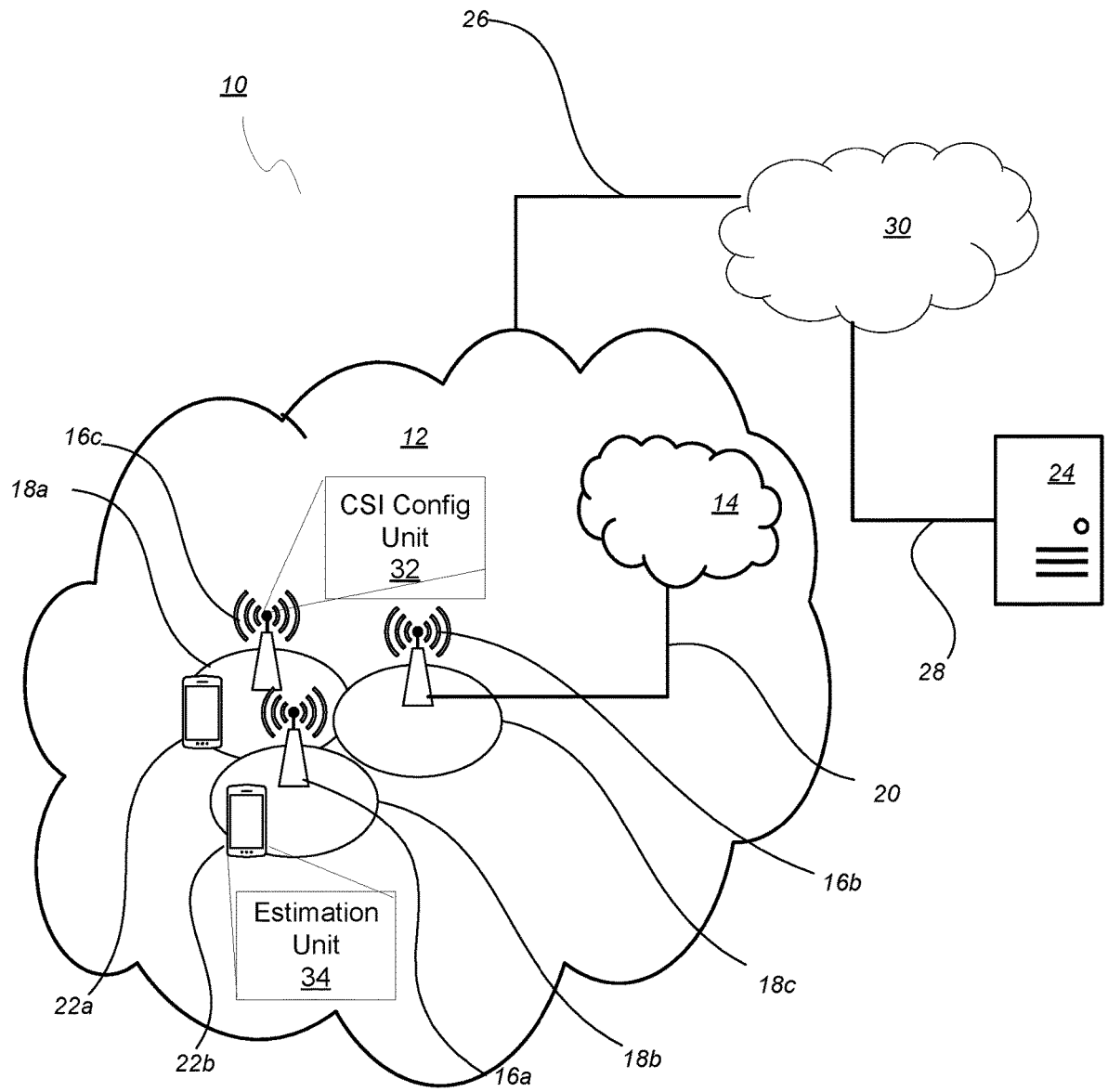
FIG. 6 is a schematic diagram of an exemplary network architecture illustrating a communication system connected via an intermediate network to a host computer according to the principles in the present disclosure.

Returning now to the drawing figures, in which like elements are referred to by like reference numerals, there is shown in FIG. 6 a schematic diagram of a communication system, according to an embodiment, including a communication system 10, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WS 22 can be in communication with an eNB—for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 6 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a CSI configuration unit 32 which is configured to configure the WD 22 with a first Channel State Information—Reference Signal (CSI-RS) resource set for channel measurement and a second CSI-RS resource set for interference measurement. A wireless device 22 is configured to include an estimation unit 34 which is configured to receive, from the network node 16, a configuration for a first Channel State Information-Reference Signal (CSI-RS) resource set for channel measurement and a second CSI-RS resource set for interference measurement.

Figure 2:
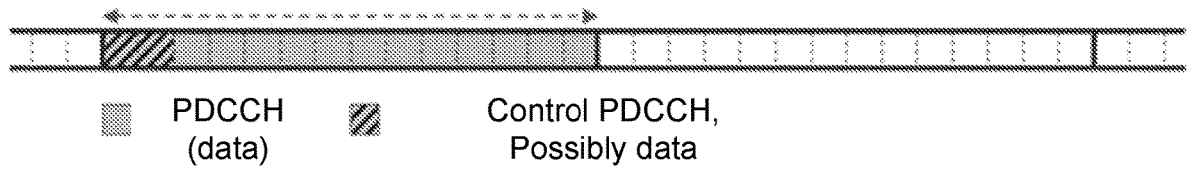
FIG. 2 illustrates an example of NR time-domain structure with 15 kHz subcarrier spacing.
Figure 3:
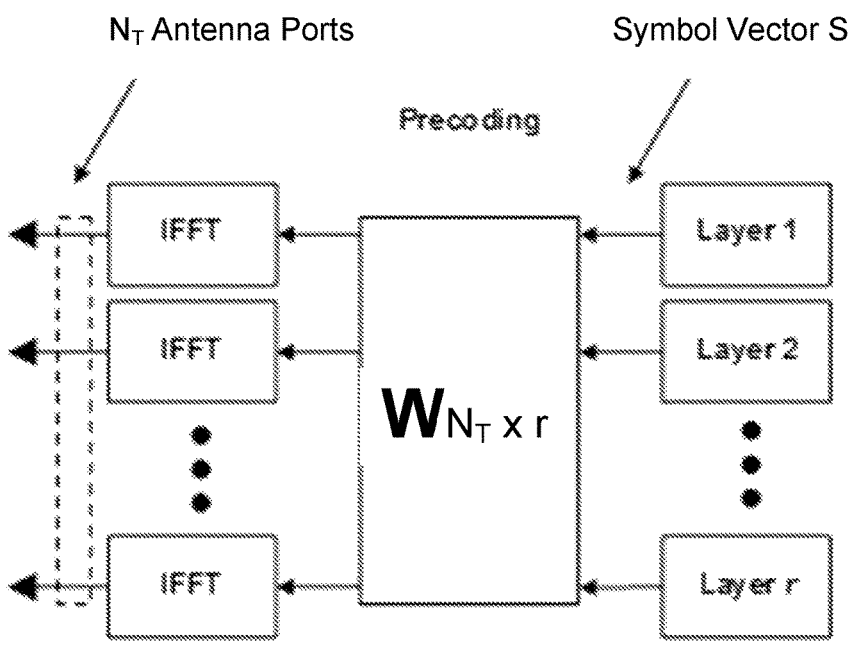
FIG. 3 illustrates an exemplary transmission structure of a precoded spatial multiplexing mode.
Figure 4:
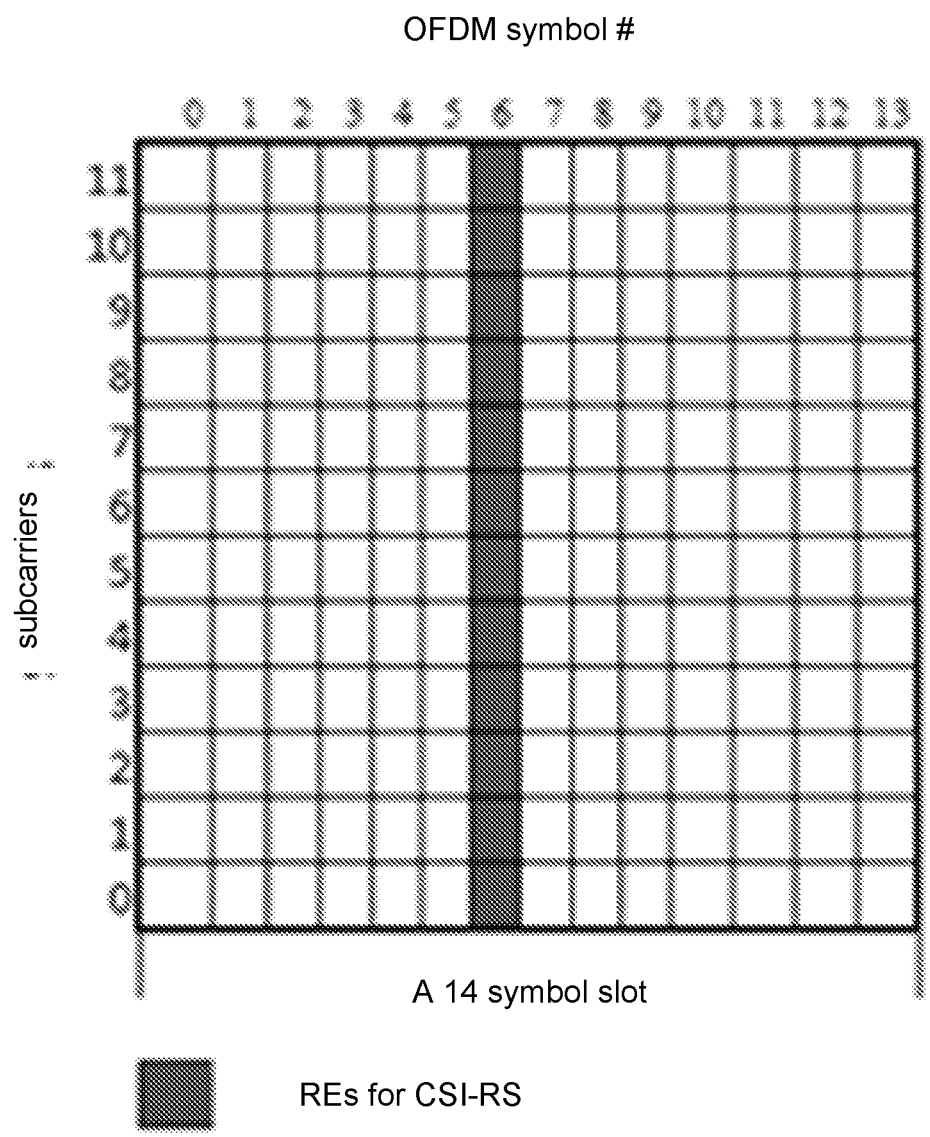
FIG. 4 illustrates an example of RE allocation for a 12-port CSI-RS.
Figure 5:
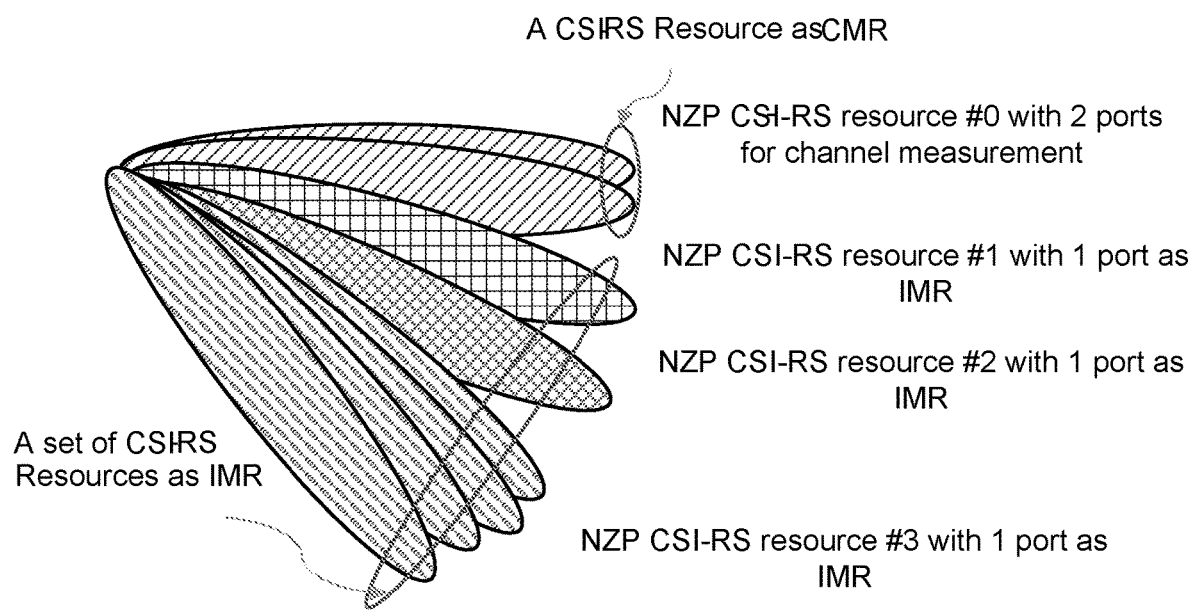
FIG. 5 illustrates an example of NZP CSI-RS resource configuration for MU interference measurement and CSI feedback.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor such, as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a communication unit 54 configured to enable the service provider to observe/monitor/control/transmit to/receive from the network node 16 and/or the wireless device 22 for performing any of the methods and techniques described herein.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor such, as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include CSI configuration unit 32 configured to configure the WD 22 with a first Channel State Information-Reference Signal (CSI-RS) resource set for channel measurement and a second CSI-RS resource set for interference measurement. In some embodiments, at least the second CSI-RS resource set for interference measurement includes more than one CSI-RS resource for the interference measurement. In some embodiments, the processing circuitry 68 is further configured to cause the radio interface to receive, from the WD 22, Channel State Information (CSI), the CSI being based on channel measurement in the first CSI-RS resource set and interference measurement in the second CSI-RS resource set. In some embodiments, the processing circuitry 68 is further configured to cause the radio interface 62 to receive, from the WD, a CSI and a CSI-RS resource indicator associated with the CSI. In some embodiments, the CSI-RS resource indicator is a CSI-RS resource index (CRI), the CRI indicating at least one CSI-RS resource in at least one of the first CSI-RS resource set and the second CSI-RS resource set. In some embodiments, a number of resources in the first CSI-RS resource set is equal to a number of resources in the second CSI-RS resource set. In some embodiments, the processing circuitry 68 is further configured to cause the radio interface 62 to receive, from the WD, a CSI and a CSI-RS resource indicator, the CSI-RS resource indicator identifying a resource pair having a highest throughput, the resource pair including one resource in the first CSI-RS resource set having a first resource index value and a corresponding resource in the second CSI-RS resource set having a second resource index value, the first resource index value being the same as the second resource index value. In some embodiments, identifying the resource pair having the highest throughput includes the WD 22 estimating CSI for each of the resource pairs in the first and second set of CSI-RS resource sets and selecting the one of the resource pairs with the highest throughput. In some embodiments, each of the resources in the first CSI-RS resource set is identical to one another. In some embodiments, the processing circuitry 68 is further configured to cause the radio interface 62 to receive, from the WD 22, a CSI and a CSI-RS resource indicator, the CSI-RS resource indicator identifying one resource in the second CSI-RS resource set having a measured interference that is smaller than a measured interference of any of the other resources in the second CSI-RS resource set. In some embodiments, the first CSI-RS resource set has only one resource. In some embodiments, the processing circuitry 68 is further configured to cause the radio interface 62 to signal, to the WD 22, an indication selecting at least one of at least two options, the at least two options including at least: a first option to accumulate measured interferences on each resource in the second CSI-RS source set for a CSI estimation, and a second option to measure interference on each resource in the second CSI-RS resource set and use the resource with the smallest measured interference for a CSI estimation.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor such, as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an estimation unit 34 configured to receive, from the network node 16, a configuration for a first Channel State Information-Reference Signal (CSI-RS) resource set for channel measurement and a second CSI-RS resource set for interference measurement. In some embodiments, at least the second CSI-RS resource set for interference measurement includes more than one CSI-RS resource for the interference measurement. In some embodiments, the processing circuitry 84 is further configured to estimate a Channel State Information (CSI) based on the channel measurement in the first CSI-RS resource set and the interference measurement in the second CSI-RS resource set. In some embodiments, the processing circuitry 84 is further configured to cause the radio interface 82 to communicate the CSI to the network node 16. In some embodiments, the processing circuitry 84 is further configured to determine a CSI-RS resource index (CRI) associated with the CSI, the CRI indicating at least one CSI-RS resource in at least one of the first CSI-RS resource set and the second CSI-RS resource set. In some embodiments, a number of resources in the first CSI-RS resource set is equal to a number of resources in the second CSI-RS resource set. In some embodiments, the processing circuitry 84 is further configured to determine a resource pair having a highest throughput, the resource pair including one resource in the first CSI-RS resource set having a first resource index value and a corresponding resource in the second CSI-RS resource set having a second resource index value, the first resource index value being the same as the second resource index value. In some embodiments, the processing circuitry 84 is further configured to determine the resource pair having the highest throughput by at least estimating CSI for each of the resource pairs in the first and second set of CSI-RS resource sets and selecting the one of the resource pairs with the highest throughput. In some embodiments, each of the resources in the first CSI-RS resource set is identical to one another. In some embodiments, the processing circuitry 84 is further configured to cause the radio interface 82 to communicate, to the network node 16, a CSI and a CSI-RS resource indicator, the CSI-RS resource indicator identifying one resource in the second CSI-RS resource set having a measured interference that is smaller than a measured interference of any of the other resources in the second CSI-RS resource set. In some embodiments, the first CSI-RS resource set has only one resource. In some embodiments, the processing circuitry 84 is further configured to cause the radio interface 82 to receive, from the network node 16, an indication selecting at least one of at least two options, the at least two options including at least: a first option to accumulate measured interferences on each resource in the second CSI-RS resource set for a CSI estimation, and a second option to measure interference on each resource in the second CSI-RS resource set and use the resource with the smallest measured interference for a CSI estimation. In some embodiments, the processing circuitry 84 is further configured to, based on the indication, at least one of: accumulate measured interferences on each resource in the second CSI-RS source set for a CSI estimation, and measure interference on each resource in the second CSI-RS resource set and use the resource with the smallest measured interference for a CSI estimation.

Figure 7:
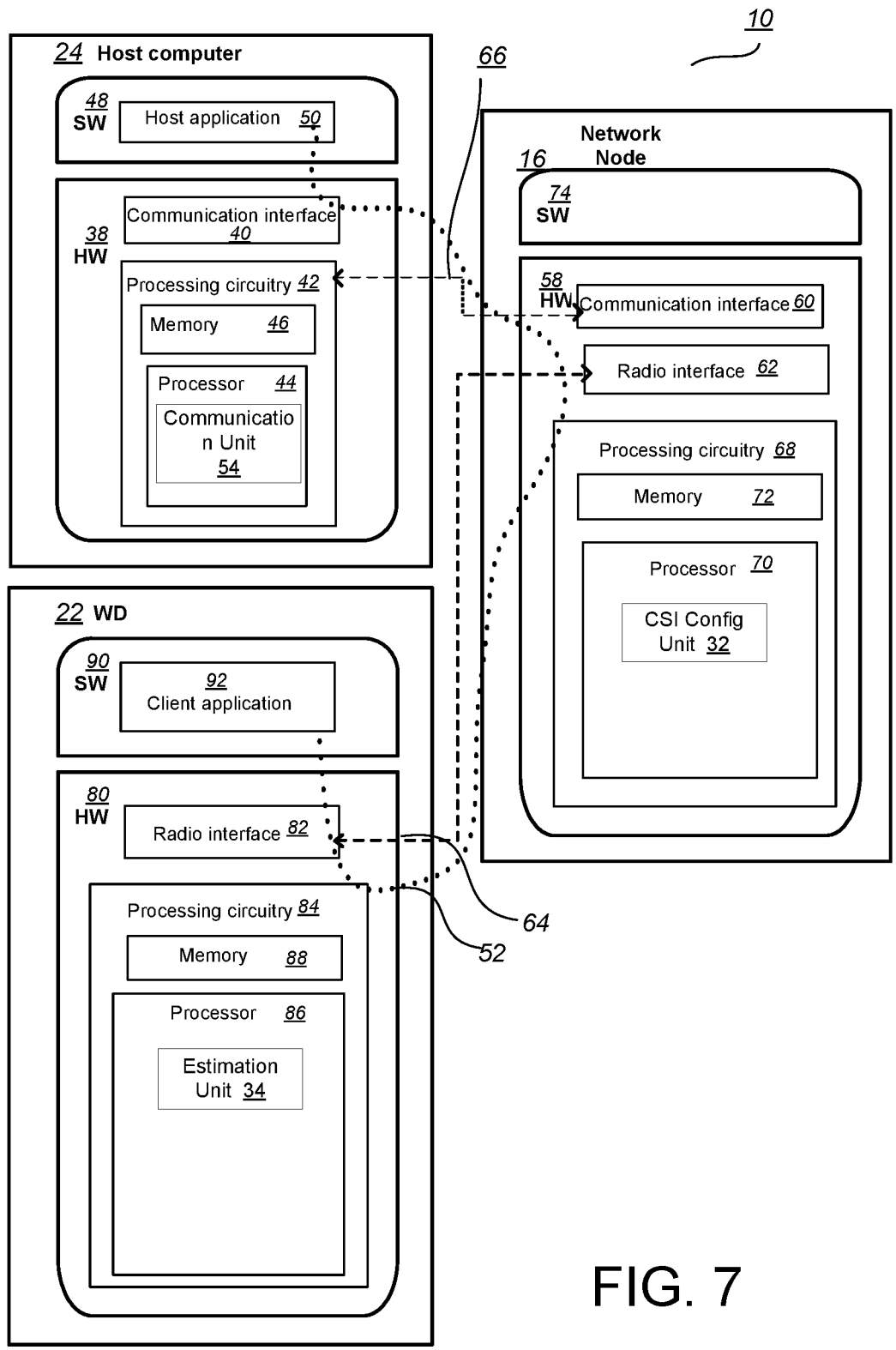
FIG. 7 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 7 and independently, the surrounding network topology may be that of FIG. 6.

In FIG. 7, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 6 and 7 show various "units" such as CSI configuration unit 32, and estimation unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 8:
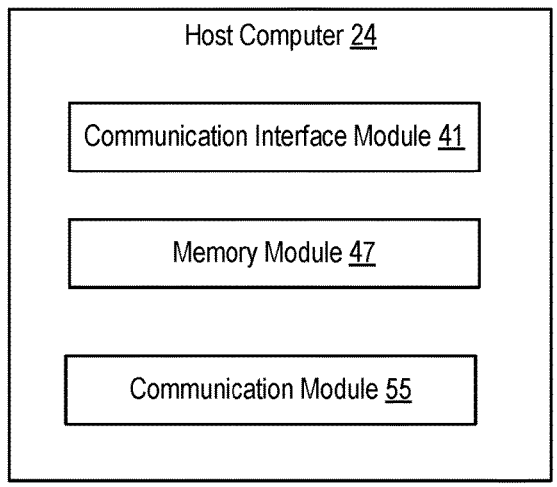
FIG. 8 is a block diagram of an alternative embodiment of a host computer according to some embodiments of the present disclosure.

FIG. 8 is a block diagram of an alternative host computer 24, which may be implemented at least in part by software modules containing software executable by a processor to perform the functions described herein. The host computer 24 include a communication interface module 41 configured to set up and maintain a wired or wireless connection with an interface of a different communication device of the communication system 10. The memory module 47 is configured to store data, programmatic software code and/or other information described herein. Communication module 55 is configured to enable the service provider to observe/monitor/control/transmit to/receive from the network node 16 and/or the wireless device 22 for performing any of the methods and techniques described herein.

Figure 9:
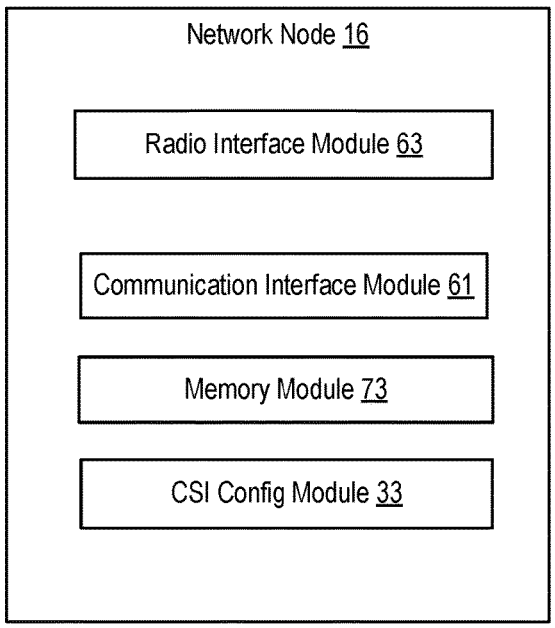
FIG. 9 is a block diagram of an alternative embodiment of a network node according to some embodiments of the present disclosure.

FIG. 9 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a WD 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The CSI configuration module 33 is configured to configure a WD 22 with the CSI-RS resource set for channel measurement and the second CSI-RS resource set for interference measurement.

Figure 10:
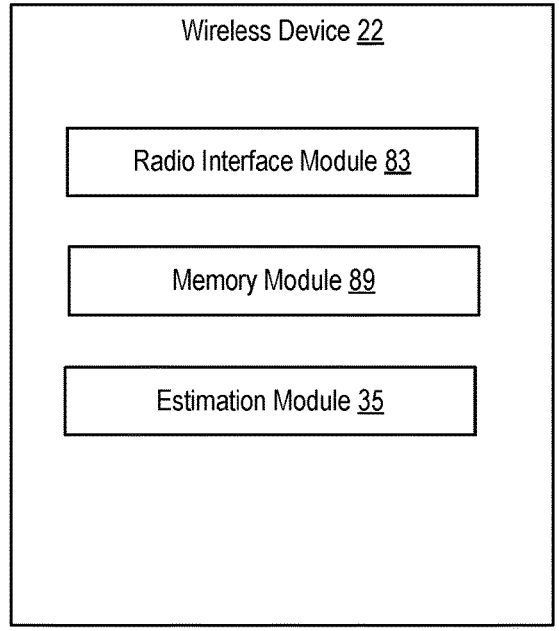
FIG. 10 is a block diagram of an alternative embodiment of a wireless device according to some embodiments of the present disclosure.

FIG. 10 is a block diagram of an alternative wireless device 22, which may be implemented at least in part by software modules containing software executable by a processor to perform the functions described herein. The WD 22 includes a radio interface module 83 configured to set up and maintain a wireless connection 64 with a network node 16 serving a coverage area 18 in which the WD 22 is currently located. The memory module 89 is configured to store data, programmatic software code and/or other information described herein. The estimation module 35 is configured to receive a configuration, from a network node, for the first CSI-RS resource set for channel measurement and the second CSI-RS resource set for interference measurement. The estimation module 53 may be further configured to estimate a Channel State Information (CSI) based on the channel measurement in the first CSI-RS resource set and the interference measurement in the second CSI-RS resource set.

Figure 11:
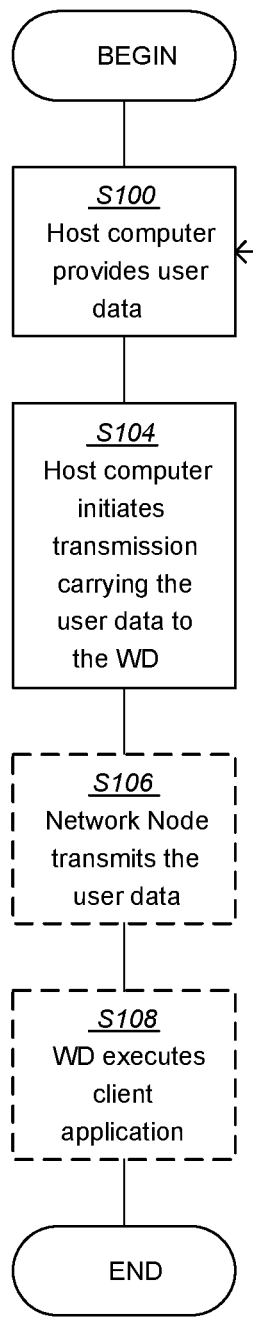

FIG. 11 is a flowchart illustrating an exemplary method implemented in a communication system, such as, for example, the communication system of FIGS. 6 and 7, in accordance with one embodiment. The communication system may include a host computer 24, a network node 16 and a WD 22, which may be those described with reference to FIG. 7. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the WD 22 (block S104). In an optional third step, the network node 16 transmits to the WD 22 the user data which was carried in the transmission that the host computer 24 initiated, in accordance with the teachings of the embodiments described throughout this disclosure (block S106). In an optional fourth step, the WD 22 executes a client application, such as, for example, the client application 114, associated with the host application 74 executed by the host computer 24 (block S108).

Figure 12:
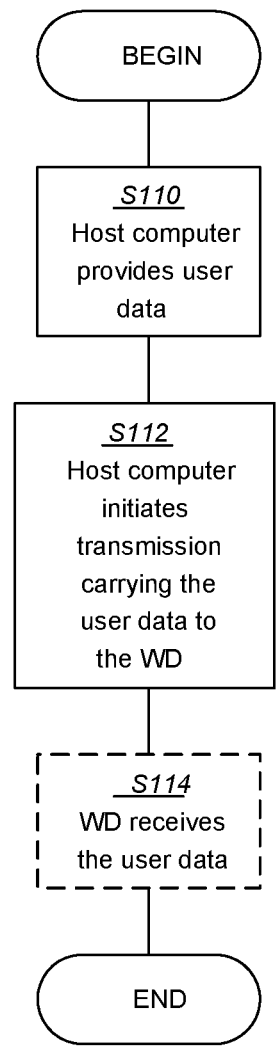

FIG. 12 is a flowchart illustrating an exemplary method implemented in a communication system, such as, for example, the communication system of FIG. 6, in accordance with one embodiment. The communication system may include a host computer 24, a network node 16 and a WD 22, which may be those described with reference to FIGS. 6 and 7. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the WD 22 (block S112). The transmission may pass via the network node 16, in accordance with the teachings of the embodiments described throughout this disclosure. In an optional third step, the WD 22 receives the user data carried in the transmission (block S114).

FIG. 13 is a flowchart illustrating an exemplary method implemented in a communication system, such as, for example, the communication system of FIG. 6, in accordance with one embodiment. The communication system may include a host computer 24, a network node 16 and a WD 22, which may be those described with reference to FIGS. 6 and 7. In an optional first step of the method, the WD 22 receives input data provided by the host computer 24 (block S116). In an optional substep of the first step, the WD 22 executes the client application 114, which provides the user data in reaction to the received input data provided by the host computer 24 (block S118). Additionally or alternatively, in an optional second step, the WD 22 provides user data (block S120). In an optional substep of the second step, the WD provides the user data by executing a client application, such as, for example, client application 114 (block S122). In providing the user data, the executed client application 114 may further consider user input received from the user. Regardless of the specific manner in which the user data was provided, the WD 22 may initiate, in an optional third substep, transmission of the user data to the host computer 24 (block S124). In a fourth step of the method, the host computer 24 receives the user data transmitted from the WD 22, in accordance with the teachings of the embodiments described throughout this disclosure (block S126).

FIG. 14 is a flowchart illustrating an exemplary method implemented in a communication system, such as, for example, the communication system of FIG. 6, in accordance with one embodiment. The communication system may include a host computer 24, a network node 16 and a WD 22, which may be those described with reference to FIGS. 6 and 7. In an optional first step of the method, in accordance with the teachings of the embodiments described throughout this disclosure, the network node 16 receives user data from the WD 22 (block S128). In an optional second step, the network node 16 initiates transmission of the received user data to the host computer 24 (block S130). In a third step, the host computer 24 receives the user data carried in the transmission initiated by the network node 16 (block S132).

Figure 15:
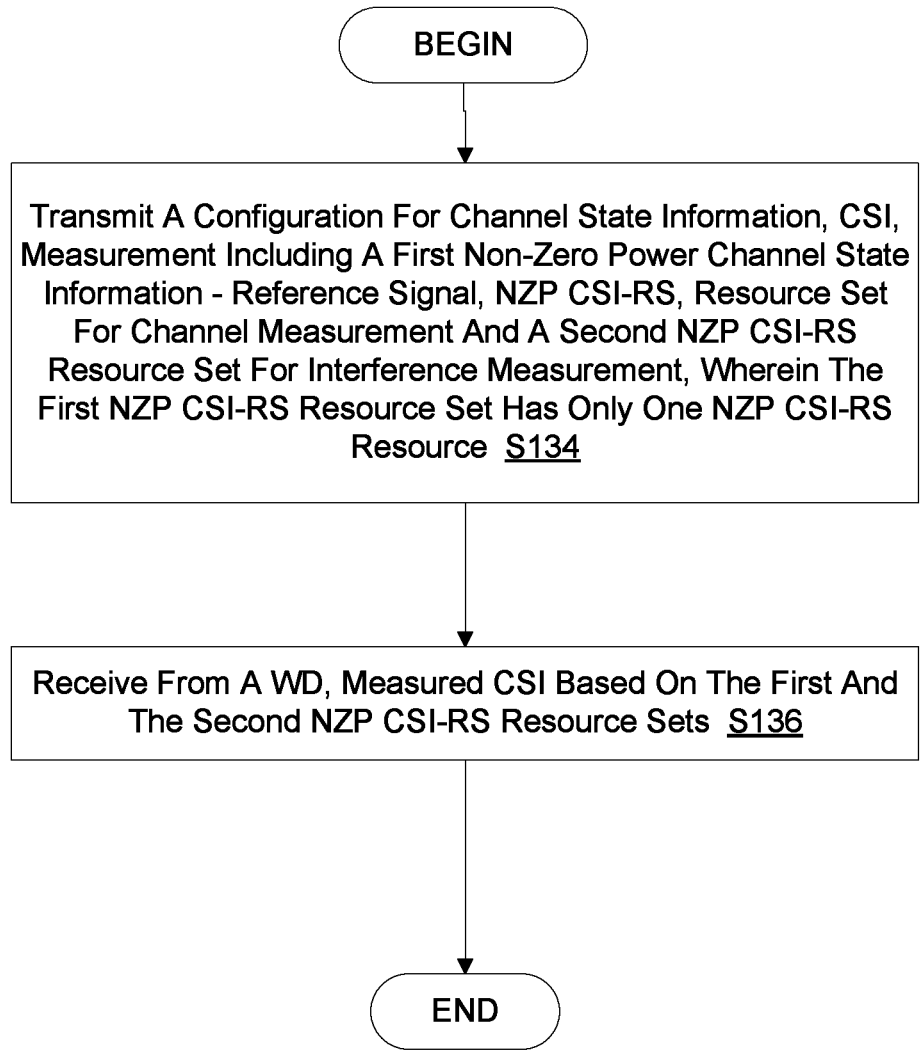
FIG. 15 is a flowchart of an exemplary process in a network node for CSI feedback with multiple interference hypotheses according to some embodiments of the present disclosure.

FIG. 15 is a flowchart of an exemplary process in a network node 16. One or more blocks described herein may be performed by one or more elements of network node 16 such as by one or more of processing circuitry 68 (including the CSI configuration unit 32), processor 70, radio interface 62 and/or communication interface 60. Network node 16 such as via processing circuitry 68 and/or processor 70 and/or radio interface 62 and/or communication interface 60 is configured to transmit a configuration for CSI measurement including a first NZP CSI-RS resource set for channel measurement and a second NZP CSI-RS resource set for interference measurement, wherein the first NZP CSI-RS resource set has only one NZP CSI-RS resource (Block S134). The process also includes receiving from a WD 22, measured CSI based on the first and the second NZP CSI-RS resource sets (Block S136).

In some embodiments, at least the second CSI-RS resource set for interference measurement includes more than one CSI-RS resource for the interference measurement. In some embodiments, the method further includes receiving, from the WD 22, Channel State Information (CSI), the CSI being based on channel measurement in the first CSI-RS resource set and interference measurement in the second CSI-RS resource set. In some embodiments, the method further includes receiving, from the WD 22, a CSI and a CSI-RS resource indicator associated with the CSI. In some embodiments, the CSI-RS resource indicator is a CSI-RS resource index (CRI), the CRI indicating at least one CSI-RS resource in at least one of the first CSI-RS resource set and the second CSI-RS resource set. In some embodiments, a number of resources in the first CSI-RS resource set is equal to a number of resources in the second CSI-RS resource set. In some embodiments, the method further includes receiving, from the WD 22, a CSI and a CSI-RS resource indicator, the CSI-RS resource indicator identifying a resource pair having a highest throughput, the resource pair including one resource in the first CSI-RS resource set having a first resource index value and a corresponding resource in the second CSI-RS resource set having a second resource index value, the first resource index value being the same as the second resource index value. In some embodiments, identifying the resource pair having the highest throughput includes the WD 22 estimating CSI for each of the resource pairs in the first and second set of CSI-RS resource sets and selecting the one of the resource pairs with the highest throughput. In some embodiments, each of the resources in the first CSI-RS resource set is identical to one another. In some embodiments, the method further includes receiving, from the WD 22, a CSI and a CSI-RS resource indicator, the CSI-RS resource indicator identifying one resource in the second CSI-RS resource set having a measured interference that is smaller than a measured interference of any of the other resources in the second CSI-RS resource set. In some embodiments, the first CSI-RS resource set has only one resource. In some embodiments, the method further includes signaling, to the WD 22, an indication selecting at least one of at least two options, the at least two options including at least: a first option to accumulate measured interferences on each resource in the second CSI-RS resource set for a CSI estimation, and a second option to measure interference on each resource in the second CSI-RS resource set and use the resource with the smallest measured interference for a CSI estimation.

Figure 16:
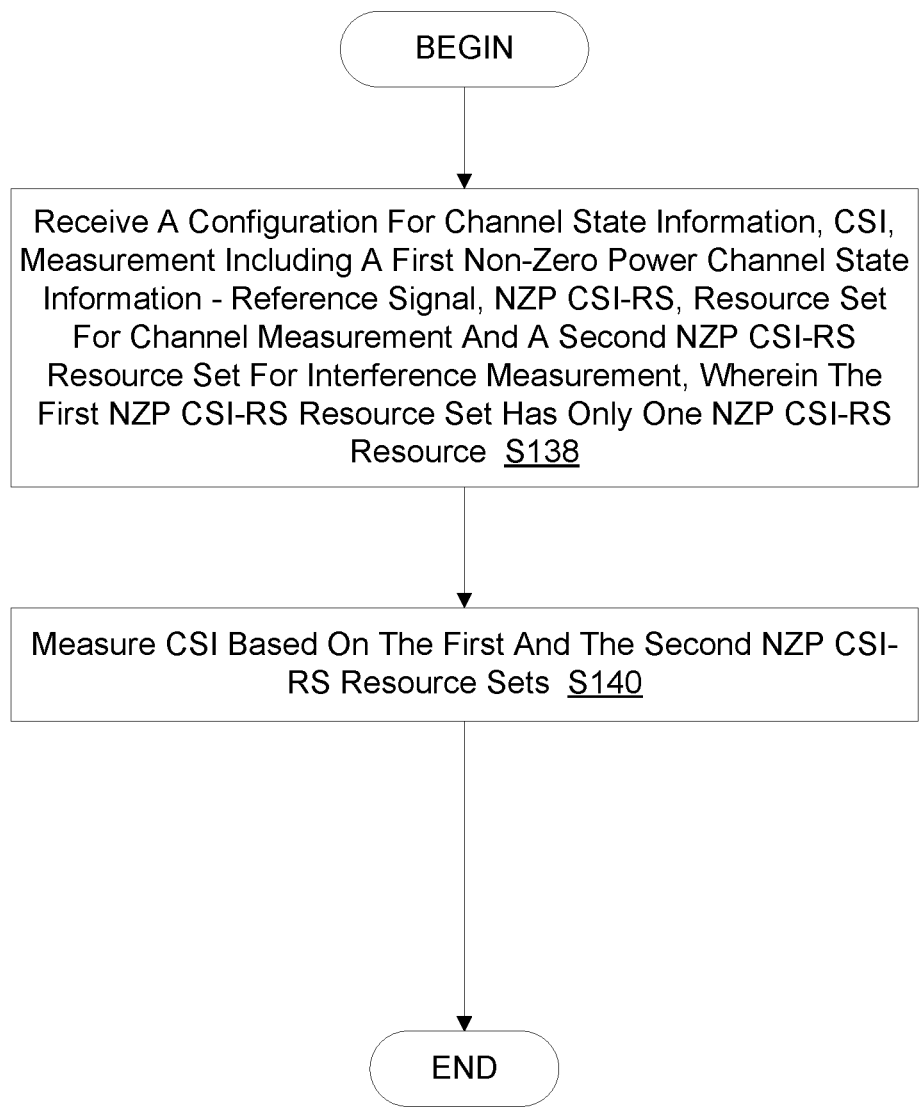
FIG. 16 is a flowchart of an exemplary process in a wireless device for CSI feedback with multiple interference hypotheses according to some embodiments of the present disclosure.

FIG. 16 is a flowchart of an exemplary process in a wireless device 22 according to some embodiments of the present disclosure. One or more blocks described herein may be performed by one or more elements of wireless device 22 such as by one or more of processing circuitry 84 (including the estimation unit 34), processor 86, radio interface 82 and/or communication interface 60. Wireless device 22 such as via processing circuitry 84 and/or processor 86 and/or radio interface 82 is configured to receive a configuration for CSI measurement including a first NZP CSI-RS, resource set for channel measurement and a second NZP CSI-RS resource set for interference measurement, wherein the first NZP CSI-RS resource set has only one NZP CSI-RS resource (Block S138). The process includes measuring CSI based on the first and the second NZP CSI-RS resource sets (Block S140).

In some embodiments, at least the second CSI-RS resource set for interference measurement includes more than one CSI-RS resource for the interference measurement. In some embodiments, the method further includes estimating a Channel State Information (CSI) based on the channel measurement in the first CSI-RS resource set and the interference measurement in the second CSI-RS resource set. In some embodiments, the method further includes communicating the CSI to the network node 16. In some embodiments, the method further includes determining a CSI-RS resource index (CRI) associated with the CSI, the CRI indicating at least one CSI-RS resource in at least one of the first CSI-RS resource set and the second CSI-RS resource set. In some embodiments, a number of resources in the first CSI-RS resource set is equal to a number of resources in the second CSI-RS resource set. In some embodiments, the method further includes determining a resource pair having a highest throughput, the resource pair including one resource in the first CSI-RS resource set having a first resource index value and a corresponding resource in the second CSI-RS resource set having a second resource index value, the first resource index value being the same as the second resource index value. In some embodiments, the method further includes determining the resource pair having the highest throughput by at least estimating CSI for each of the resource pairs in the first and second set of CSI-RS resource sets and selecting the one of the resource pairs with the highest throughput. In some embodiments, each of the resources in the first CSI-RS resource set is identical to one another. In some embodiments, the method further includes communicating, to the network node 16, a CSI and a CSI-RS resource indicator, the CSI-RS resource indicator identifying one resource in the second CSI-RS resource set having a measured interference that is smaller than a measured interference of any of the other resources in the second CSI-RS resource set. In some embodiments, the first CSI-RS resource set has only one resource. In some embodiments, the method further includes receiving, from the network node 16, an indication selecting at least one of at least two options, the at least two options including at least: a first option to accumulate measured interferences on each resource in the second CSI-RS resource set for a CSI estimation, and a second option to measure interference on each resource in the second CSI-RS resource set and use the resource with the smallest measured interference for a CSI estimation. In some embodiments, the method further includes, based on the indication, at least one of: accumulating measured interferences on each resource in the second CSI-RS resource set for a CSI estimation, and measuring interference on each resource in the second CSI-RS resource set and use the resource with the smallest measured interference for a CSI estimation.

Having described some embodiments of the present disclosure, a more detailed description of some of the embodiments is provided below.

Some embodiments of the present disclosure provide that, for a given WD 22, the network node 16 (e.g., gNB) determines and/or identifies which other WD 22 or WDs 22 may be paired to this WD 22 for MU-MIMO. The candidate WDs may be determined by the network node 16 based on, for example, a prior CSI feedback or reciprocity information. For example, if {WD #0, WD #1, WD #2} are identified as the candidate WDs 22, then network node 16 may determine one or more of:

(a) whether all the identified candidate WDs 22 (e.g., the three WDs {WD #0, WD #1, WD #2}) can be paired together. In this case, each WD 22 may be configured with one CSI-RS resource for CMR, e.g., as follows:
   CMR:
      WD #0: NZP CSI-RS #0;
      WD #1: NZP CSI-RS #1;
      WD #2: NZP CSI-RS #2.
   IMR:
      WD #0: {NZP CSI-RS #1, NZP CSI-RS #2};
      WD #1: {NZP CSI-RS #0, NZP CSI-RS #2};
      WD #2: {NZP CSI-RS #0, NZP CSI-RS #1}.

(b) If there is too much MU interference (e.g., at or beyond a predetermined MU interference threshold) with pairing all three WDs 22 together, then the network node 16 may determine whether any two of the identified WDs 22 be paired instead. Stated another way, in one embodiment, if the network node 16 determines that the MU interference for a plurality of candidate WDs 22 to be paired together for MU-MIMO at least meets an interference threshold, the network node 16 may determine if a subset of the plurality of candidate WDs 22 (less than the plurality) can be paired together with an MU interference that does not at least meet the interference threshold. Stated yet another way, in some embodiments, the network node 16 may be configured to determine a pairing of two or more candidate WDs together for MU-MIMO in which the MU interference of the pairing does not at least meet an interference threshold. In some embodiments, scenario (b) can be addressed with more than one NZP CSI-RS resource in a resource set for channel measurement.

According to a first embodiment of the present disclosure, when a WD 22 is configured with a first NZP CSI-RS resource set for channel measurement and an associated second NZP CSI-RS resource set for interference measurement, the number of resources in the two resource sets may be the same. Furthermore, the kth NZP CSI-RS resource in the first resource set may be associated with the kth NZP CSI-RS resource in the second resource set. In some embodiments, each of the resource sets may be considered to include more than one resource in the set.

For example, a WD 22 can be configured with two resource sets:

A first NZP CSI-RS resource set for channel measurement may include:
{NZP CSI-RS #0, NZP CSI-RS #3, NZP CSI-RS #2}; and A second NZP CSI-RS resource set for interference measurement may include:
{NZP CSI-RS #1, NZP CSI-RS #2, NZP CSI-RS #0}.

FIG. 17 illustrates an exemplary configuration or arrangement of the two resource sets in the example described immediately above.

In one aspect, the WD 22 may estimate CSI for each resource pair, one resource in the first resource set for channel measurement and the other resource in the second resource set for interference measurement. For example, a CSI may be estimated by the WD 22 for NZP CSI-RS #0 (which may be consider the first in the resource set for channel measurement) and NZP CSI-RS #1 (which may be considered the corresponding first in the resource set for interference measurement). The WD 22 may select the best or optimal estimate CSI, e.g., the CSI with the highest throughput, and feeds back, to, for example, the network node 16, the CSI together with a CSI-RS resource index (CRI) corresponding to the index of the resource pair associated with the CSI in the resource sets. For example, if the best/optimal CSI is obtained on the resource pair {NZP CSI-RS #0 (for channel), NZP CSI-RS #1 (for interference)}, then CRI=0, and if the best CSI is obtained on the resource pair {NZP CSI-RS #3 (for channel), NZP CSI-RS #2 (for interference)}, then CRI=1 (assuming that the index of the resource set(s) follows sequentially 0, 1, 2).

According to a second embodiment of the present disclosure, when a WD 22 is configured with a first NZP CSI-RS resource set for channel measurement and an associated second NZP CSI-RS resource set for interference measurement, the number of resources in the two resource sets is the same. Furthermore, in one aspect, the kth NZP CSI-RS resource in the first resource set is associated with the kth NZP CSI-RS resource in the second resource set. Moreover, the NZP CSI-RS resources in the first resource set can be the same in some embodiments.

For example, a WD 22 can be configured with two resource sets:

A first NZP CSI-RS resource set for channel measurement:
{NZP CSI-RS #0, NZP CSI-RS #0, NZP CSI-RS #0}; and A second NZP CSI-RS resource set for interference measurement:
{NZP CSI-RS #1, NZP CSI-RS #2, NZP CSI-RS #3}.

FIG. 18 illustrates the exemplary configuration or arrangement of the two resource sets in the example described immediately above.

According to one aspect, the WD 22 may measure the channel on NZP CSI-RS #0 and may measure the interferences on the three NZP CSI-RS resources, i.e., {NZP CSI-RS #1, NZP CSI-RS #2, NZP CSI-RS #3}. The WD 22 may select the NZP CSI-RS resource with the smallest measured interference and estimate CSI based on the channel measurement and the smallest interference. The WD 22 may then feed back to, for example, the network node 16, a CRI corresponding to the resource index of the selected NZP CSI-RS resource with the smallest interference and the estimated CSI. For example, if the smallest interference is measured by the WD 22 on NZP CSI-RS #1, then CRI=0, and if the smallest interference is measured on NZP CSI-RS #2, then CRI=1, and so forth.

Figure 19:
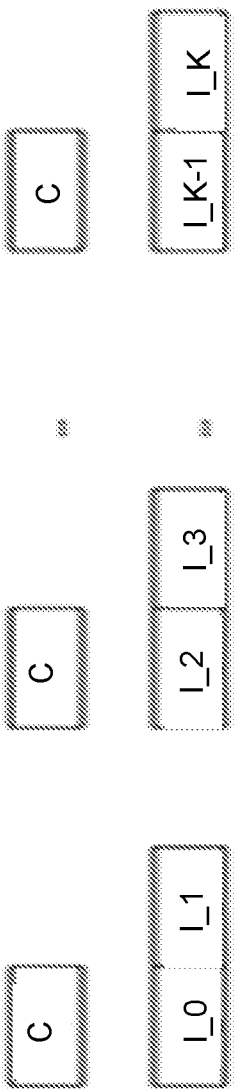
FIG. 19 illustrates an example in which a number of NZP CSI-RS resources in the resource set for CMR is different than the ones in the resource set for IMR.

In another embodiment, the number of NZP CSI-RS resources in the resource set for interference measurement can be different than the number of NZP CSI-RS resources in the resource set for channel measurement. One example of this embodiment is shown in FIG. 19.

Figure 20:
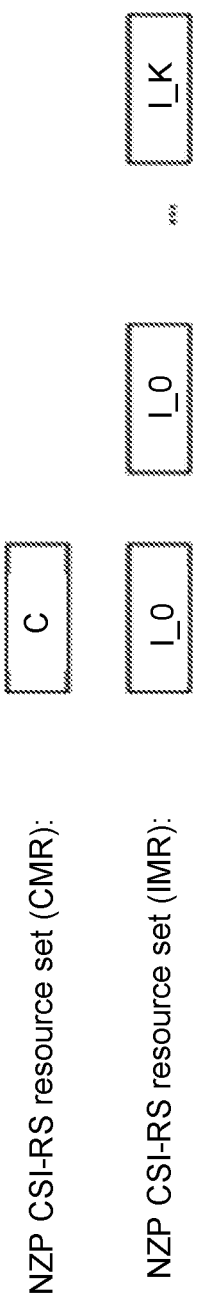
FIG. 20 illustrates an example of a third embodiment of resource sets of the present disclosure.

According to a third embodiment, when a WD 22 is configured with a first NZP CSI-RS resource set for channel measurement and an associated second NZP CSI-RS resource set for interference measurement, and there is a single resource in the first resource set for channel measurement (see for example FIG. 20), the WD 22 may be indicated with at least one of two options:

Option 1: the measured interferences on the second resource set may be accumulated for CSI estimation. The WD 22 may report to the network node 16 only the CSI;

Option 2: the WD 22 measures interference on each NZP CSI-RS resource in the second resource set and selects the smallest interference for CSI estimation. The WD 22 may report back to the network node 16 a CRI corresponding to the resource index of the NZP CSI-RS resource in the second resource set with the smallest interference.

Thus, according to one aspect, a method implemented in a WD 22 is provided. The method includes receiving a configuration for CSI measurement including a first NZP CSI-RS, resource set for channel measurement and a second NZP CSI-RS resource set for interference measurement, wherein the first NZP CSI-RS resource set has only one NZP CSI-RS resource. The method further includes measuring, via the processing circuitry 84, CSI based on the first and the second NZP CSI-RS resource sets.

According to this aspect, in some embodiments, the CSI measurement comprises a channel measurement based on the first NZP CSI-RS resource set and an interference measurement based on the second NZP CSI-RS resource set. In some embodiments, the CSI measurement considers all interferences on each of one or more NZP CSI-RS resources in the second NZP CSI-RS resource set. In some embodiments, the method further includes reporting the measured CSI.

According to another aspect, a WD 22 comprising processing circuitry is provided. The processing circuitry 84 configured to receive a configuration for CSI measurement including a first NZP CSI-RS resource set for channel measurement and a second NZP CSI-RS resource set for interference measurement, wherein the first NZP CSI-RS resource set has only one NZP CSI-RS resource. The processing circuitry 84 is also configured to measure CSI based on the first and the second NZP CSI-RS resource sets.

According to this aspect, in some embodiments, the CSI measurement comprises a channel measurement based on the first NZP CSI-RS resource set and an interference measurement based on the second NZP CSI-RS resource set. In some embodiments, the CSI measurement considers all interferences on each of one or more NZP CSI-RS resources in the second NZP CSI-RS resource set. In some embodiments, the processing circuitry 84 is further configured to report the measured Channel State Information, CSI.

According to yet another aspect, a method implemented in a network node 16 is provided. The method includes transmitting a configuration for CSI including a first NZP CSI-RS resource set for channel measurement and a second NZP CSI-RS resource set for interference measurement, wherein the first NZP CSI-RS resource set has only one NZP CSI-RS resource. The method also includes receiving from a WD 22, measured CSI based on the first and the second NZP CSI-RS resource sets.

According to this aspect, in some embodiments, the CSI measurement comprises a channel measurement based on the first NZP CSI-RS resource set and an interference measurement based on the second NZP CSI-RS resource set. In some embodiments, the CSI measurement considers all interferences on each of one or more NZP CSI-RS resources in the second NZP CSI-RS resource set.

According to another aspect, a network node 16 includes processing circuitry 68 configured to transmit to a WD 22 a configuration for CSI measurement including a first NZP CSI-RS resource set for channel measurement and a second NZP CSI-RS resource set for interference measurement, wherein the first NZP CSI-RS resource set has only one NZP CSI-RS resource. The processing circuitry 68 is further configured to receive from the WD 22, measured CSI based on the first and the second NZP CSI-RS resource sets.

According to this aspect, in some embodiments, the CSI measurement comprises a channel measurement based on the first NZP CSI-RS resource set and an interference measurement based on the second NZP CSI-RS resource set. In some embodiments, the CSI measurement considers all interferences on each of one or more NZP CSI-RS resources in the second NZP CSI-RS resource set.

Some embodiments are as follows:

Embodiment A1. A network node configured to communicate with a wireless device (WD), the network node configured to, and/or comprising a radio interface and/or comprising processing circuitry configured to configure the WD with a first Channel State Information-Reference Signal (CSI-RS) resource set for channel measurement and a second CSI-RS resource set for interference measurement.

Embodiment A2. The network node of Embodiment A1, wherein at least the second CSI-RS resource set for interference measurement includes more than one CSI-RS resource for the interference measurement.

Embodiment A3. The network node of any of Embodiments A1 and A2, wherein the processing circuitry is further configured to cause the radio interface to receive, from the WD, Channel State Information (CSI), the CSI being based on channel measurement in the first CSI-RS resource set and interference measurement in the second CSI-RS resource set.

Embodiment A4. The network node of any of Embodiments A1-A3, wherein the processing circuitry is further configured to cause the radio interface to receive, from the WD, a CSI and a CSI-RS resource indicator associated with the CSI.

Embodiment A5. The network node of Embodiment A4, wherein the CSI-RS resource indicator is a CSI-RS resource index (CRI), the CRI indicating at least one CSI-RS resource in at least one of the first CSI-RS resource set and the second CSI-RS resource set.

Embodiment A6. The network node of any of Embodiments A1-A5, wherein a number of resources in the first CSI-RS resource set is equal to a number of resources in the second CSI-RS resource set.

Embodiment A7. The network node of Embodiment A6, wherein the processing circuitry is further configured to cause the radio interface to receive, from the WD, a CSI and a CSI-RS resource indicator, the CSI-RS resource indicator identifying a resource pair having a highest throughput, the resource pair including one resource in the first CSI-RS resource set having a first resource index value and a corresponding resource in the second CSI-RS resource set having a second resource index value, the first resource index value being the same as the second resource index value.

Embodiment A8. The network node of Embodiment A7, wherein identifying the resource pair having the highest throughput includes the WD estimating CSI for each of the resource pairs in the first and second set of CSI-RS resource sets and selecting the one of the resource pairs with the highest throughput.

Embodiment A9. The network node of any of Embodiments A1-A5, wherein each of the resources in the first CSI-RS resource set is identical to one another.

Embodiment A10. The network node of Embodiment A9, wherein the processing circuitry is further configured to cause the radio interface to receive, from the WD, a CSI and a CSI-RS resource indicator, the CSI-RS resource indicator identifying one resource in the second CSI-RS resource set having a measured interference that is smaller than a measured interference of any of the other resources in the second CSI-RS resource set.

Embodiment A11. The network node of any of Embodiments A1-A5, wherein the first CSI-RS resource set has only one resource.

Embodiment A12. The network node of Embodiment A11, wherein the processing circuitry is further configured to cause the radio interface to signal, to the WD, an indication selecting at least one of at least two options, the at least two options including at least:

a first option to accumulate measured interferences on each resource in the second CSI-RE source set for a CSI estimation, and a second option to measure interference on each resource in the second CSI-RS resource set and use the resource with the smallest measured interference for a CSI estimation.

Embodiment B1. A method implemented in a network node, the method comprising configuring a WD with a first Channel State Information-Reference Signal (CSI-RS) resource set for channel measurement and a second CSI-RS resource set for interference measurement.

Embodiment B2. The method of Embodiment B1, wherein at least the second CSI-RS resource set for interference measurement includes more than one CSI-RS resource for the interference measurement.

Embodiment B3. The method of any of Embodiments B1 and B2, further comprising receiving, from the WD, Channel State Information (CSI), the CSI being based on channel measurement in the first CSI-RS resource set and interference measurement in the second CSI-RS resource set.

Embodiment B4. The method of any of Embodiments B1-B3, further comprising receiving, from the WD, a CSI and a CSI-RS resource indicator associated with the CSI.

Embodiment B5. The method of Embodiment B4, wherein the CSI-RS resource indicator is a CSI-RS resource index (CRI), the CRI indicating at least one CSI-RS resource in at least one of the first CSI-RS resource set and the second CSI-RS resource set.

Embodiment B6. The method of any of Embodiments B1-B5, wherein a number of resources in the first CSI-RS resource set is equal to a number of resources in the second CSI-RS resource set.

Embodiment B7. The method of Embodiment B6, further comprising receiving, from the WD, a CSI and a CSI-RS resource indicator, the CSI-RS resource indicator identifying a resource pair having a highest throughput, the resource pair including one resource in the first CSI-RS resource set having a first resource index value and a corresponding resource in the second CSI-RS resource set having a second resource index value, the first resource index value being the same as the second resource index value.

Embodiment B8. The method of Embodiment B7, wherein identifying the resource pair having the highest throughput includes the WD estimating CSI for each of the resource pairs in the first and second set of CSI-RS resource sets and selecting the one of the resource pairs with the highest throughput.

Embodiment B9. The method of any of Embodiments B1-B5, wherein each of the resources in the first CSI-RS resource set is identical to one another.

Embodiment B10. The method of Embodiment B9, further comprising receiving, from the WD, a CSI and a CSI-RS resource indicator, the CSI-RS resource indicator identifying one resource in the second CSI-RS resource set having a measured interference that is smaller than a measured interference of any of the other resources in the second CSI-RS resource set.

Embodiment B11. The method of any of Embodiments B1-B5, wherein the first CSI-RS resource set has only one resource.

Embodiment B12. The method of Embodiment B11, further comprising signaling, to the WD, an indication selecting at least one of at least two options, the at least two options including at least:

a first option to accumulate measured interferences on each resource in the second CSI-RE source set for a CSI estimation, and a second option to measure interference on each resource in the second CSI-RS resource set and use the resource with the smallest measured interference for a CSI estimation.

Embodiment C1. A wireless device (WD) configured to communicate with a network node, the WD configured to, and/or comprising a radio interface and/or processing circuitry configured to cause the radio interface to receive, from the network node, a configuration for a first Channel State Information-Reference Signal (CSI-RS) resource set for channel measurement and a second CSI-RS resource set for interference measurement.

Embodiment C2. The WD of Embodiment C1, wherein at least the second CSI-RS resource set for interference measurement includes more than one CSI-RS resource for the interference measurement.

Embodiment C3. The WD of any of Embodiments C1 and C2, wherein the processing circuitry is further configured to estimate a Channel State Information (CSI) based on the channel measurement in the first CSI-RS resource set and the interference measurement in the second CSI-RS resource set.

Embodiment C4. The WD of any of Embodiments C1-C3, wherein the processing circuitry is further configured to cause the radio interface to communicate the CSI to the network node.

Embodiment C5. The WD of any of Embodiments C1-C4, wherein the processing circuitry is further configured to determine a CSI-RS resource index (CRI) associated with the CSI, the CRI indicating at least one CSI-RS resource in at least one of the first CSI-RS resource set and the second CSI-RS resource set.

Embodiment C6. The WD of any of Embodiments C1-C5, wherein a number of resources in the first CSI-RS resource set is equal to a number of resources in the second CSI-RS resource set.

Embodiment C7. The WD of Embodiment C6, wherein the processing circuitry is further configured to determine a resource pair having a highest throughput, the resource pair including one resource in the first CSI-RS resource set having a first resource index value and a corresponding resource in the second CSI-RS resource set having a second resource index value, the first resource index value being the same as the second resource index value.

Embodiment C8. The WD of Embodiment C7, wherein the processing circuitry is further configured to determine the resource pair having the highest throughput by at least estimating CSI for each of the resource pairs in the first and second set of CSI-RS resource sets and selecting the one of the resource pairs with the highest throughput.

Embodiment C9. The WD of any of Embodiments C1-C5, wherein each of the resources in the first CSI-RS resource set is identical to one another.

Embodiment C10. The WD of Embodiment C9, wherein the processing circuitry is further configured to cause the radio interface to communicate, to the network node, a CSI and a CSI-RS resource indicator, the CSI-RS resource indicator identifying one resource in the second CSI-RS resource set having a measured interference that is smaller than a measured interference of any of the other resources in the second CSI-RS resource set.

Embodiment C11. The WD of any of Embodiments C1-C5, wherein the first CSI-RS resource set has only one resource.

Embodiment C12. The WD of Embodiment C11, wherein the processing circuitry is further configured to cause the radio interface to receive, from the network node, an indication selecting at least one of at least two options, the at least two options including at least:

a first option to accumulate measured interferences on each resource in the second CSI-RE source set for a CSI estimation, and a second option to measure interference on each resource in the second CSI-RS resource set and use the resource with the smallest measured interference for a CSI estimation.

Embodiment C13. The WD of Embodiment C12, wherein the processing circuitry is further configured to, based on the indication, at least one of:

accumulate measured interferences on each resource in the second CSI-RS source set for a CSI estimation, and measure interference on each resource in the second CSI-RS resource set and use the resource with the smallest measured interference for a CSI estimation.

Embodiment D1. A method implemented in a wireless device (WD), the method comprising receiving, from the network node, a configuration for a first Channel State Information-Reference Signal (CSI-RS) resource set for channel measurement and a second CSI-RS resource set for interference measurement.

Embodiment D2. The method of Embodiment D1, wherein at least the second CSI-RS resource set for interference measurement includes more than one CSI-RS resource for the interference measurement.

Embodiment D3. The method of any of Embodiments D1 and D2, further comprising estimating a Channel State Information (CSI) based on the channel measurement in the first CSI-RS resource set and the interference measurement in the second CSI-RS resource set.

Embodiment D4. The method of any of Embodiments D1-D3, further comprising communicating the CSI to the network node.

Embodiment D5. The method of any of Embodiments D1-D4, further comprising determining a CSI-RS resource index (CRI) associated with the CSI, the CRI indicating at least one CSI-RS resource in at least one of the first CSI-RS resource set and the second CSI-RS resource set.

Embodiment D6. The method of any of Embodiments D1-D5, wherein a number of resources in the first CSI-RS resource set is equal to a number of resources in the second CSI-RS resource set.

Embodiment D7. The method of Embodiment D6, further comprising determining a resource pair having a highest throughput, the resource pair including one resource in the first CSI-RS resource set having a first resource index value and a corresponding resource in the second CSI-RS resource set having a second resource index value, the first resource index value being the same as the second resource index value.

Embodiment D8. The method of Embodiment D7, further comprising determining the resource pair having the highest throughput by at least estimating CSI for each of the resource pairs in the first and second set of CSI-RS resource sets and selecting the one of the resource pairs with the highest throughput.

Embodiment D9. The method of any of Embodiments D1-D5, wherein each of the resources in the first CSI-RS resource set is identical to one another.

Embodiment D10. The method of Embodiment D9, further comprising communicating, to the network node, a CSI and a CSI-RS resource indicator, the CSI-RS resource indicator identifying one resource in the second CSI-RS resource set having a measured interference that is smaller than a measured interference of any of the other resources in the second CSI-RS resource set.

Embodiment D11. The method of any of Embodiments D1-D5, wherein the first CSI-RS resource set has only one resource.

Embodiment D12. The method of Embodiment D11, further comprising receiving, from the network node, an indication selecting at least one of at least two options, the at least two options including at least:

a first option to accumulate measured interferences on each resource in the second CSI-RE source set for a CSI estimation, and a second option to measure interference on each resource in the second CSI-RS resource set and use the resource with the smallest measured interference for a CSI estimation.

Embodiment D13. The method of Embodiment D12, further comprising, based on the indication, at least one of:

accumulating measured interferences on each resource in the second CSI-RS source set for a CSI estimation, and measuring interference on each resource in the second CSI-RS resource set and use the resource with the smallest measured interference for a CSI estimation.

Embodiment E1. A network node, comprising:

a memory module configured to store an indication of a first Channel State Information-Reference Signal (CSI-RS) resource set for channel measurement and a second CSI-RS resource set for interference measurement; and a Channel Station Information (CSI) configuration module configured to configure a WD with the CSI-RS resource set for channel measurement and the second CSI-RS resource set for interference measurement.

Embodiment E2. A wireless device, comprising:

a memory module configured to store an indication of a first Channel State Information-Reference Signal (CSI-RS) resource set for channel measurement and a second CSI-RS resource set for interference measurement; and an estimation module configured to:

receive a configuration, from a network node, for the first CSI-RS resource set for channel measurement and the second CSI-RS resource set for interference measurement; and estimate a Channel State Information (CSI) based on the channel measurement in the first CSI-RS resource set and the interference measurement in the second CSI-RS resource set.

Embodiment E3. A host computer, comprising:

a communication module configured to at least one of observe, monitor, control, transmit, and receive information associated with any of the methods of Embodiments A1 and/or C1.

Embodiment F1. A method of channel state information (CSI) feedback in a wireless network comprising of at least a wireless network node and one or more wireless devices (WDs), the method comprising one or more of:

configuring, by the network node, a wireless device with a first set of N CSI reference signal (CSI-RS) resources for channel measurement (i.e. a first resource set) and a second set of M CSI-RS resources for interference measurement (i.e. a second resource set);

estimating, by the wireless device, a CSI based on channel measurement in the first resource set (as described in the configuring step, although the estimating step may be performed independently of the configuring step) and interference measurement in the second resource set (as described in the configuring step, although the estimating step may be performed independently of the configuring step); and reporting, by the wireless device, the CSI (as described in the estimating step, although the reporting step may be performed independently of the estimating step) and a CSI-RS resource indicator associated with the CSI.

Embodiment F2. Method of embodiment F1, wherein N equals to M.

Embodiment F3. Methods of either one of embodiment F1 or F2, wherein the estimating further comprising estimating N CSIs, where the nth CSI is based on a channel measurement on the kth CSI-RS resource in the first and an interference measurement on the nth CSI-RS resource in the second resource sets and determining a CSI out of the N CSIs.

Embodiment F4. Methods of embodiments F1 and F3, wherein the CSI-RS resource indicator associated with the CSI is the index of a CSI-RS resource in the first resource set over which the determined CSI is estimated, wherein the first resource in the set has an index of 0.

Embodiment F5. Method of embodiment F4, wherein determining a CSI out of the N CSIs comprises selecting the CSI which provides the highest throughput.

Embodiment F6. Methods of any one of embodiments F1-F5, wherein the N CSI-RS resources in the first resource set are identical.

Embodiment F7. Methods of either one of embodiments F1 and F2, wherein the configuring further comprises configuring a third resource set of N CSI-IM resources.

Embodiment F8. Methods of either one of embodiments F1-F7, wherein the estimating further comprises estimating N CSIs, where the nth CSI is based on a channel measurement on the kth CSI-RS resource in the first and an interference measurement on the nth CSI-RS resource in the second resource sets and on the nth
CSI-IM resource in the third resource sets.

Embodiment F9. Method of any one of embodiment F1, wherein N equals to 1.

Embodiment F10. Methods of any one of embodiments F1 and F9, wherein the method further comprising signaling an indication of one of
Option a: interferences measured on the CSI-RS resources in the second resource set are to be accumulated for a single CSI estimation or
Option b: interference measured on each CSI-RS resource in the second resource set is used for a separate CSI estimation.

Embodiment F11. Methods of any one of embodiments F1, F9 and F10, wherein if option a is signaled, the CRI is not reported.

Embodiment F12. Methods of any one of embodiments F1, F9 and F10, wherein if option b is signaled, M CSIs are estimated each associated with a CSI-RS resource in the second resource set.

Embodiment F13. Methods of any one of embodiments F1, F9, 10 and F12, wherein M CSIs are estimated each associated with a CSI-RS resource in the second resource set.

Embodiment F14. Methods of any one of embodiments F1, F9, F10 to F13, wherein the estimating further comprising determining a CSI out of the M CSIs.

Embodiment F15. Method of embodiment F14, wherein the determining comprises selecting a CSI which provides the highest throughput.

Embodiments F16. Apparatuses such as network nodes or wireless devices comprising processing circuitry or modules configured to perform methods or steps of methods as in any one of embodiments F1-F14.

In some embodiments, configuring a radio node, in particular a terminal or user equipment or the WD 22, may refer to the radio node being adapted or caused or set and/or instructed to operate according to the configuration. Configuring may be done by another device, e.g., a network node 16 (for example, a radio node of the network like a base station or eNodeB) or network, in which case the network node or network may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources, or e.g., configuration for performing certain measurements on certain subframes or radio resources. A radio node may configure itself, e.g., based on configuration data received from a network or network node 16. A network node 16 may use, and/or be adapted to use, its circuitry for the configuring. Allocation information may be considered a form of configuration data. Configuration data may comprise and/or be represented by configuration information, and/or one or more corresponding indications and/or message/s.

Generally, in some embodiments, configuring may include determining configuration data representing the configuration and providing, e.g. transmitting, the configuration data to one or more other nodes (parallel and/or sequentially), which may transmit the configuration data further to the radio node (or another node, which may be repeated until the configuration data reaches the wireless device 22). Alternatively, or additionally, configuring a radio node, e.g., by a network node 16 or other device, may include receiving configuration data and/or data pertaining to configuration data, e.g., from another node like a network node 16, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD 22) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD 22) may comprise configuring the WD 22 to perform certain measurements on certain subframes or radio resources and reporting such measurements according to embodiments of the present disclosure.

In some embodiments, signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g., comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

In some embodiments, communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

In some embodiments, an indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale.

A variety of modifications and variations are possible in light of the above teachings without departing from the scope of the following claims.

What is claimed is:

1. A method implemented in a wireless device, WD, configured to communicate with a network node, the method comprising:
    receiving from the network node a configuration for Channel State Information, CSI, measurement including a first Non-Zero Power Channel State Information-Reference Signal, NZP CSI-RS, resource set for channel measurement and a second NZP CSI-RS resource set for interference measurement, the first NZP CSI-RS resource set having at least one NZP CSI-RS resource, the second NZP CSI-RS resource set having a plurality of NZP CSI-RS resources and being configured for a pairing of the WD with other WDs that produces a lower interference than is achieved with a different pairing of WDs;
    accumulating interferences measured on each of the plurality of NZP CSI-RS resources of the second NZP CSI-RS resource set; and
    measuring CSI based on the first and the second NZP CSI-RS resource sets, the CSI measurement being based at least in part on the accumulated interferences measured on the plurality of NZP CSI-RS resources of the second NZP CSI-RS resource set, the measured CSI based on the second NZP CSI-RS resource set being indicative of a level of interference when the WD is paired with other WDs; and
    transmitting an indication of the accumulated interferences to the network node.

2. The method of claim 1, further comprising reporting the CSI measurement without reporting a CSI-RS resource index, CRI.

3. The method of claim 1, further comprising reporting the CSI measurement.

4. A wireless device, WD, configured to communicate with a network node, comprising processing circuitry configured to:
  receive from the network node a configuration for Channel State Information, CSI, measurement including a first Non-Zero Power Channel State Information-Reference Signal, NZP CSI-RS, resource set for channel measurement and a second NZP CSI-RS resource set for interference measurement, the first NZP CSI-RS resource set having at least one NZP CSI-RS resource, the second NZP CSI-RS resource set having a plurality of NZP CSI-RS resources and being configured for a pairing of the WD with other WDs that produces a lower interference than is achieved with a different pairing of WDs;
  accumulating interferences measured on each of the plurality of NZP CSI-RS resources of the second NZP CSI-RS resource set; and
  measure CSI based on the first and the second NZP CSI-RS resource sets, the CSI measurement being based at least in part on the accumulated interferences measured on the plurality of NZP CSI-RS resources of the second NZP CSI-RS resource set, the measured CSI based on the second NZP CSI-RS resource set being indicative of a level of interference when the WD is paired with other WDs; and
  causing transmission of an indication of the accumulated interferences to the network node.

5. The WD of claim 4, wherein the processing circuitry is further configured to report the CSI measurement without reporting a CSI-RS resource index, CRI.

6. The WD of claim 4, wherein the processing circuitry is further configured to report the CSI measurement.

7. A method implemented in a network node configured to communicate with a wireless device, WD, the method comprising:
  determining a configuration for Channel State Information, CSI, measurement including a first Non-Zero Power Channel State Information—Reference Signal, NZP CSI-RS, resource set for channel measurement and a second NZP CSI-RS resource set for interference measurement, the first NZP CSI-RS resource set having at least one NZP CSI-RS resource, the second NZP CSI-RS resource set having a plurality of NZP CSI-RS resources, the configuration being determined for a particular pairing of WDs that produces a lower interference than is achieved with a different pairing of WDs; and
  receiving from the WD, CSI that is based at least in part on the first and the second NZP CSI-RS resource sets and an accumulation of interferences measured by the WD on the NZP CSI-RS resources in the second NZP CSI-RS resource set.

8. The method of claim 7, wherein the CSI is received without a reporting of a CSI-RS resource index, CRI.

9. A network node configured to communicate with a wireless device, WD, comprising processing circuitry configured to:
  determine a configuration for Channel State Information, CSI, measurement including a first Non-Zero Power Channel State Information —Reference Signal, NZP CSI-RS, resource set for channel measurement and a second NZP CSI-RS resource set for interference measurement, the first NZP CSI-RS resource set having at least one NZP CSI-RS resource, the second NZP CSI-RS resource set having a plurality of NZP CSI-RS resources, the configuration being determined for a particular pairing of WDs that produces a lower interference than is achieved with a different pairing of WDs; and
  receive from the WD, CSI that is based at least in part on the first and the second NZP CSI-RS resource sets and an accumulation of interferences measured by the WD on the NZP CSI-RS resources in the second NZP CSI-RS resource set.

10. The network node of claim 9, wherein the CSI is received without a reporting of a CSI-RS resource index, CRI.

* * * * *